US009482454B2

(12) United States Patent
Goel et al.

(10) Patent No.: US 9,482,454 B2
(45) Date of Patent: Nov. 1, 2016

(54) COMPRESSOR OPERATION MANAGEMENT IN AIR CONDITIONERS

(71) Applicant: Lennox Industries Inc., Richardson, TX (US)

(72) Inventors: Rakesh Goel, Irving, TX (US); Anuradha Sundararajan, Allen, TX (US); H. Gene Havard, Jr., Carrollton, TX (US); Mark Olsen, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 151 days.

(21) Appl. No.: 14/279,975

(22) Filed: May 16, 2014

(65) Prior Publication Data

US 2015/0330688 A1 Nov. 19, 2015

(51) Int. Cl.
*F25B 49/02* (2006.01)
*F25B 31/00* (2006.01)

(52) U.S. Cl.
CPC ........... *F25B 49/022* (2013.01); *F25B 31/002* (2013.01); *F25B 49/02* (2013.01); *F25B 2400/01* (2013.01); *F25B 2400/075* (2013.01); *F25B 2500/19* (2013.01); *F25B 2500/31* (2013.01); *F25B 2600/0272* (2013.01); *F25B 2700/173* (2013.01); *F25B 2700/1933* (2013.01); *F25B 2700/21155* (2013.01)

(58) Field of Classification Search
CPC ..................... F25B 31/022; F25B 2600/0272; F25B 2500/31; F25B 2700/173; F25B 2400/01; F25B 2500/19; F25B 2700/1933; F25B 2700/2115
See application file for complete search history.

(56) References Cited

U.S. PATENT DOCUMENTS

| | | | | |
|---|---|---|---|---|
| 6,487,869 B1 * | 12/2002 | Sulc | B60H 1/3205 | 62/228.4 |
| 6,622,500 B1 * | 9/2003 | Archibald | B60H 1/3205 | 62/173 |
| 2005/0091997 A1 * | 5/2005 | Lee | F25B 49/022 | 62/175 |
| 2007/0266719 A1 * | 11/2007 | Kang | F24F 11/001 | 62/228.5 |
| 2009/0288432 A1 * | 11/2009 | Lifson | F25B 5/02 | 62/115 |
| 2010/0057263 A1 | 3/2010 | Tutunoglu | | |
| 2011/0174002 A1 | 7/2011 | Jang et al. | | |
| 2011/0314845 A1 * | 12/2011 | Lifson | F25B 49/022 | 62/115 |
| 2013/0104580 A1 * | 5/2013 | Choi | F25B 1/10 | 62/115 |
| 2013/0145781 A1 * | 6/2013 | Liu | F25B 1/02 | 62/115 |
| 2014/0236361 A1 * | 8/2014 | Noll | G05D 16/2006 | 700/276 |

FOREIGN PATENT DOCUMENTS

| | | |
|---|---|---|
| EP | 2551612 A2 | 1/2013 |
| JP | 2004309027 | 11/2004 |
| WO | 2013047754 A1 | 4/2013 |

* cited by examiner

*Primary Examiner* — Emmanuel Duke
(74) *Attorney, Agent, or Firm* — Bell Nunnally & Martin LLP; Craig J. Cox

(57) ABSTRACT

In various implementations, compressor operation in an air conditioner may be managed by maintaining oil viscosity, a temperature differential, compressor sump temperature, and/or suction pressure. Properties of the air conditioner or portions thereof, such as the compressor, may be determined. To manage compressor operations, operation(s) of the air conditioner may be adjusted based on one or more of the determined properties.

20 Claims, 6 Drawing Sheets

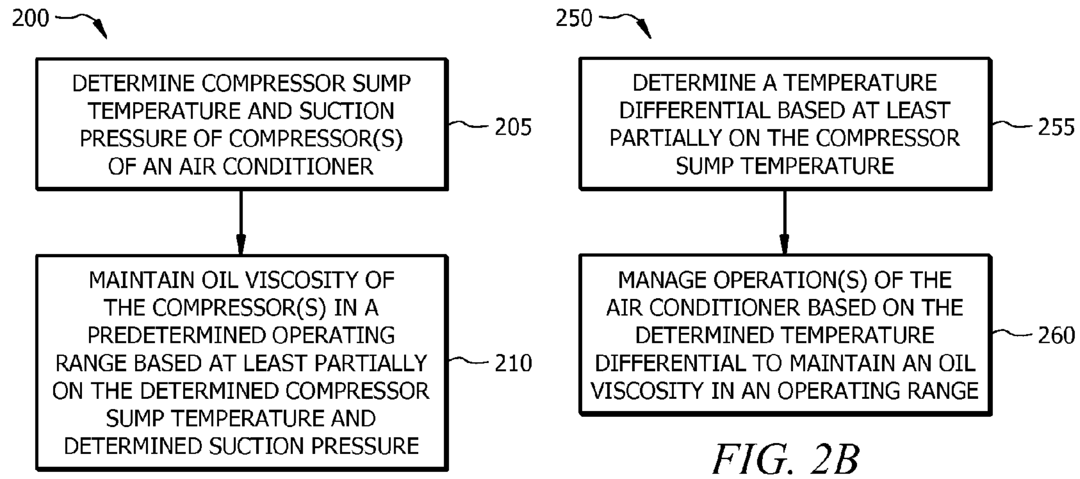
*FIG. 2A*
*FIG. 2B*
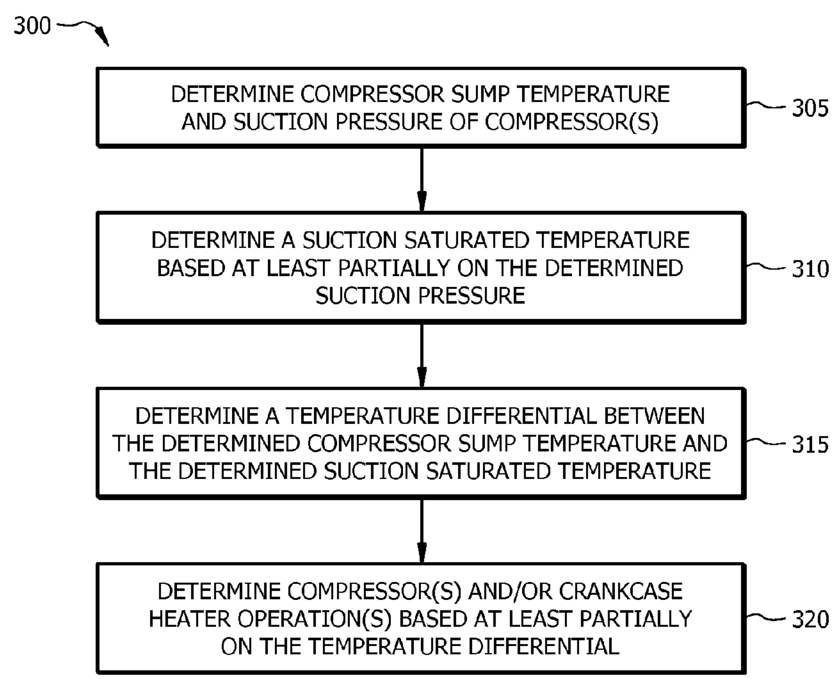
*FIG. 3*

COMPRESSOR OPERATION MANAGEMENT IN AIR CONDITIONERS

TECHNICAL FIELD

The present disclosure relates to management of compressors, and more particularly to control of oil properties in compressors of air conditioners and/or refrigeration systems.

BACKGROUND

Air conditioners operate in a variety of operating parameters. For example, air conditioners may include compressors that operate at part load and full load. Air conditioners may include specifications selected for operations at a full load. Thus, when operating at part load, the air conditioners may be less efficient (e.g., energy and/or cost), performance may be sacrificed (e.g., since the air conditioner may operate at the specifications for full load during part load), and/or less reliable (e.g., since temperatures and/or pressures may fluctuate).

SUMMARY

In various implementations, compressor operations may be managed by controlling properties of the compressor, such as oil viscosity, temperature differential(s) (e.g., between a compressor sump temperature and a suction saturated temperature), compressor sump temperature, and/or suction pressure. For example, one or more properties (e.g., of an air conditioner or refrigeration system) may be maintained. Oil viscosity of compressor(s), a temperature differential, compressor sump temperature, and/or suction pressure may be maintained in ranges, in some implementations. The oil viscosity, compressor sump temperature, temperature differential (e.g., between a compressor sump temperature and a suction saturated temperature) and/or suction pressure may be related. Properties of a system (e.g., air conditioner system and/or refrigeration system) or portions thereof, such as the compressor, may be determined. Operations of the air conditioner or portions thereof may be adjusted based on the determined properties to maintain an oil viscosity, suction pressure, temperature differential, and/or compressor sump temperature in a predetermined range. For example, fan operations, compressor operations, and/or crankcase heater operations, may be managed to maintain oil viscosity, compressor sump temperature, a temperature differential, and/or suction pressure. When the oil viscosity, compressor sump temperature, temperature differential, and/or suction pressure are managed, the compressor operations may also be managed and performance of the compressor may be maintained (e.g., oil migration may be inhibited, oil dilution may be inhibited, etc.).

In various implementations, air conditioner operations may be managed. A compressor sump temperature and a suction pressure of an air conditioner may be determined. A suction saturated temperature may be determined based at least partially on the determined suction pressure. A temperature differential may be determined based on the difference between the determined compressor sump temperature and the determined saturated temperature. Oil viscosity associations may be retrieved. The oil viscosity associations may include associations between oil viscosities, suction pressures, and/or compressor sump temperatures. A minimum temperature differential may be determined based at least partially on the suction pressure and the retrieved oil viscosity associations. Operation(s) of the air conditioner may be managed based at least partially on the determined minimum temperature differential and the determined temperature differential.

Implementations may include one or more of the following features. Managing operation(s) of the air conditioner may include managing operation(s) of the air conditioner such that the determined temperature differential is above the determined minimum temperature differential. In some implementations, managing operation(s) of the air conditioner may include reducing speed(s) of fan(s) of an evaporator of the air conditioner if the determined suction pressure is greater than a predetermined maximum suction pressure. At least one of the fans may include at least one high speed and at least one lower speed, and where reducing speed(s) of the fan(s) includes allowing operation at one of the lower speeds. In some implementations, if the determined temperature differential is less than the determined minimum temperature differential one or more operations of the air conditioner may be managed. A second compressor sump temperature may be determined during at least one of the adjusted operations of the air conditioner, and operation(s) of the air conditioner may be adjusted such that the determined second compressor sump temperature is greater than the determined minimum compressor sump temperature. Adjusting the operation(s) of the air conditioner may include adjusting operation of compressor(s) and/or crankcase heater(s) of the air conditioner. In some implementations, a determination may be made whether the determined suction pressure is below a predetermined low suction pressure; and freeze stat protection operation(s) may be allowed if the determined suction pressure is determined to be below the predetermined low suction pressure. Oil viscosity associations may include associations between oil viscosities and temperature differentials.

In various implementations, managing air conditioner operations may include determining a compressor sump temperature and a suction pressure of the air conditioner. A suction saturated temperature may be determined based at least partially on a refrigerant coefficient and the determined suction pressure. A temperature differential may be determined. The temperature differential may be based at least partially on the difference between the determined compressor sump temperature and the determined suction saturated temperature. A determination may be made, based at least partially on the temperature differential, whether to adjust operations of at least one of compressor(s) and/or crankcase heater(s). If a determination is made to adjust operations based at least partially on the temperature differential, adjusting operations of at least one of the compressor(s) and/or the crankcase heater(s).

Implementations may include one or more of the following features. A determination may be made whether one or more compressors of the air conditioner are operating at part load. The suction saturated temperature may be determined based at least partially on a refrigerant coefficient and the determined suction pressure if one or more of the compressors are determined to operate at part load. In some implementations, a first period of time may be allowed to elapse if one or more of the compressors are determined to operate at part load. The compressor sump temperature and the suction pressure may be determined after allowing the first period of time to elapse. In some implementations, the determined temperature differential may be compared to a first predetermined range, wherein the first predetermined range includes values greater than a predetermined high value. If the temperature differential is determined to be in the first predetermined range, operation may be restricted of a crankcase heater associated with a compressor, in which operation is restricted. In some implementations, the determined temperature differential may be compared to a second predetermined range. The second predetermined range may include values from a predetermined high value to a predetermined mid value. An ambient temperature may be determined, and a determination may be made whether the ambient temperature is in a first low ambient temperature range. If the temperature differential is in the second predetermined range, and if the ambient temperature is in the first low ambient temperature range, then allowing operation of one or more crankcase heaters associated one or more compressors, in which operation is restricted. The determined temperature differential may be compared to a third predetermined range. The third predetermined range may include values from a predetermined mid value to a predetermined low value. If the temperature differential is in a third predetermined range, operation may be allowed of at least one compressor, in which operation is restricted, and operation may be restricted in at least one compressor, in which operation is allowed. In some implementations, oil viscosity associations may be retrieved, wherein the oil viscosity associations may include associations between oil viscosities, suction pressures, and compressor sump temperatures. A minimum compressor sump temperature to maintain a predetermined oil viscosity at the determined suction pressure may be retrieved based on the retrieved oil viscosity associations. A second temperature differential may be determined based at least partially on the difference between the determined compressor sump temperature and the determined suction pressure. Operation(s) of the air conditioner may be determined based at least partially on the determined second temperature differential. The determined temperature differential may be compared to a fourth predetermined range. The fourth predetermined range may include values less than a predetermined low value. If the termination temperature is in the fourth predetermined range of temperatures, operation may be restricted in each compressor of the air conditioner and operation may be allowed in each crankcase heater. In some implementations, second compressor sump temperatures may be determined for each of the compressors during operation of the crankcase heaters. Operation of each of the crankcase heaters may be allowed until each of the second compressor sump temperatures is greater than approximately 20 degrees Fahrenheit and/or the difference between a first second compressor sump temperature and a second compressor sump temperature is less than approximately 3 degrees Fahrenheit.

In various implementations, operation of an air conditioner may be allowed, and a determination may be made whether a change in one or more operating conditions of the air conditioner has occurred. A first period of time may be allowed to elapse if a determination has been made that a change in the system operating condition(s) has occurred. A suction pressure of the air conditioner (e.g., of compressor(s) of the air conditioner) may be determined. A determination may be made whether the determined suction pressure is greater than a predetermined maximum pressure. Speed(s) of evaporator fan(s) may be reduced if the determined suction pressure is greater than the predetermined maximum pressure.

Implementations may include one or more of the following. A reduced speed for one or more of the evaporator fans may be maintained until an additional change in one or more of the operating conditions. In some implementations, a second suction pressure may be determined when the speed of one or more of the evaporator fans is reduced. One or more additional reductions in speed of one or more of the evaporator fans may be allowed if the determined second suction pressure is greater than the predetermined maximum suction pressure.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which:

FIG. 2A illustrates an implementation of an example process for maintaining oil viscosity.

FIG. 2B illustrates an implementation of an example process for maintaining oil viscosity.

FIG. 3 illustrates an implementation of an example process for managing compressor operations.

Like reference symbols in the various drawings indicate like elements.

DETAILED DESCRIPTION

In various implementations, compressor(s) of systems, such as an air conditioner and/or refrigeration system, may operate in a variety of operating conditions. The operation of the system (e.g., air conditioner and/or refrigeration system) may change based on request received from users for operation of the system and/or operating conditions.

For example, to satisfy a request to an air conditioner for cool air during low ambient temperatures (e.g., below approximately 65 degrees), compressor(s) of the air conditioner may operate at part load to satisfy the user request. When the compressor(s) operate at part load, and/or other operating conditions, the viscosity of the oil in the compressor may drop below an oil viscosity operating range (e.g., an oil viscosity operating range may include viscosities greater than approximately 5 cp). For example, operating compressor(s) at part load may decrease the temperature of the lubricating fluid in the compressor (e.g., since the compressor may generate less heat when operating at part load and/or when operations are restricted). When a temperature of a lubricating fluid (e.g., compressor oil and/or refrigerant) decreases below a minimum oil temperature and/or when a temperature differential between the compressor sump temperature and another reference temperature value (e.g., minimum compressor sump temperature for operation of the compressor and/or suction saturated temperature), the viscosity of the oil may decrease and/or oil dilution may occur. Thus, maintenance of the oil viscosity in an oil viscosity operating range may improve performance, reliability, and/or cost efficiency of the air conditioner.

Figure 1:
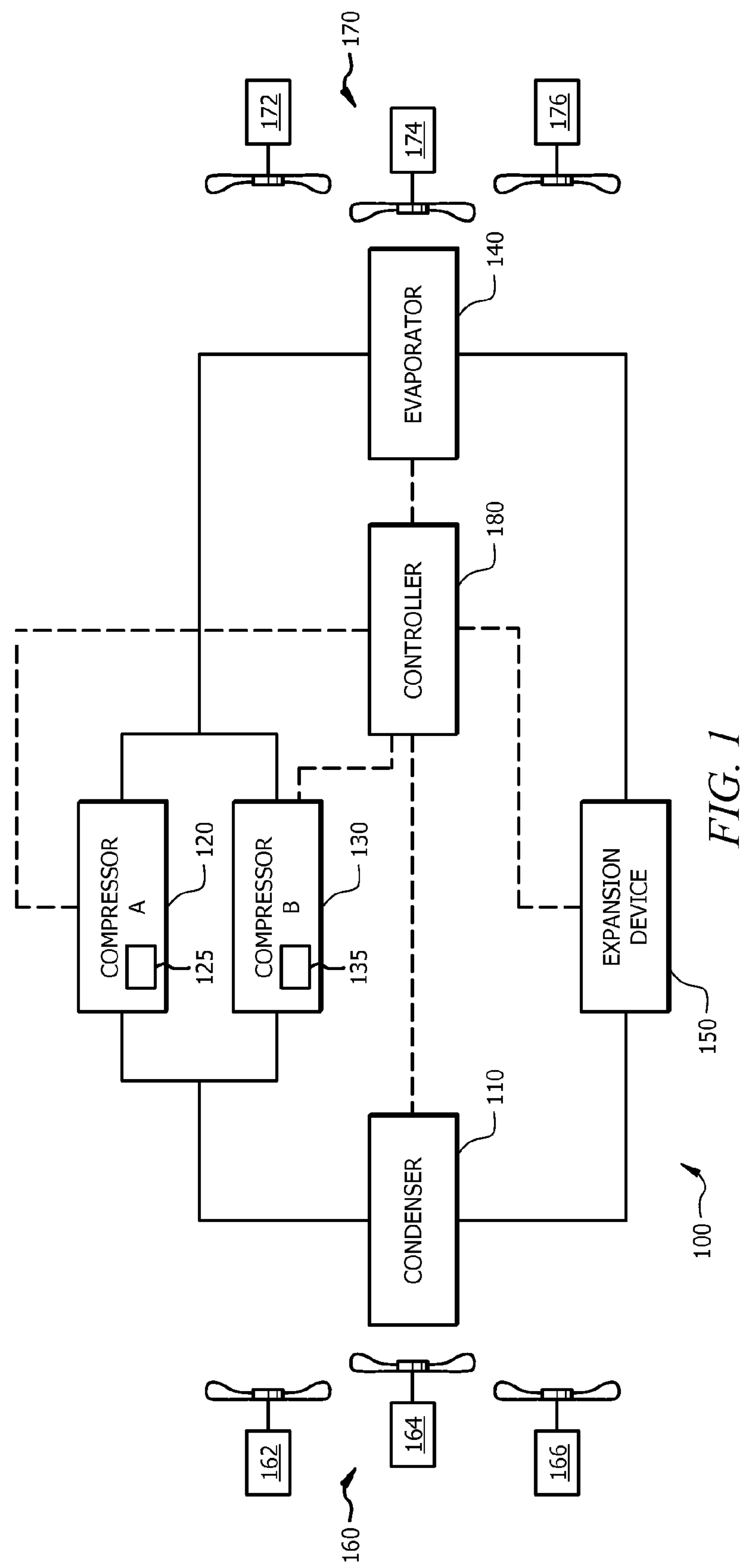
FIG. 1 illustrates an implementation of an example air conditioner.

FIG. 1 illustrates an implementation of an example air conditioner 100. The air conditioner may include components such as a condenser 110, compressor A 120, compressor B 130, and evaporator 140. One or more of the compressors 120, 130 may include a crank case heater 125, 135. Lines (e.g., tubing) may couple various components and allow refrigerant to flow in and/or out of various components of the air conditioner 100.

Fans 160, 170 may cause air to flow through the condenser 110 and/or the evaporator 170. As illustrated, the air conditioner 100 may include more than one fan to provide air flow to the condenser 110 and/or more than one fan to provide air flow to the evaporator 170. As illustrated, the air conditioner 100 may include a first condenser fan 162, a second condenser fan 164, and a third condenser fan 166 to provide air flow to the condenser 110 and a first evaporator fan 172, a second evaporator fan 174, and a third evaporator fan 176 to provide air flow to the evaporator 170.

The condenser 110 may include an appropriate condenser. In some implementations, the condenser 110 may be a microchannel condenser (e.g., condenser with a channel size less than approximately 1 mm). Microchannel condensers may be sensitive to operating conditions during operation of the air conditioner (e.g., when compared with other condensers (e.g., condenser with tube size greater than 5 mm)). For example, microchannel condensers may be sensitive to refrigerant charge (e.g., a level of refrigerant in the system). When a microchannel condenser has a refrigerant charge greater than a maximum operating charge, the pressure in the microchannel condenser may become elevated due to the refrigerant capacity size difference between the microchannel condenser and the evaporator. The high pressures (e.g., pressures greater than approximately 615 psi, with a refrigerant that includes R-410A refrigerant) may cause mechanical failure, including prefailure events, such as excessive wear on parts and/or high pressure switch activations. Thus, the air conditioner may control the system to manage stability and/or inhibit mechanical failure of the air conditioning system.

Fans 160 may provide air flow to the condenser 110. The fan(s) 160 may include any appropriate number of fans, such as one, two, three, or four fans. A fan 160 may be any appropriate type of fan, such as a centrifugal fan. A fan 160 may include more than one fan setting. For example, the fan may include a multi-speed fan (e.g., one or more settings) and/or a variable speed fan. In some implementations, a fan may include a high setting and one or more low settings. The settings may be associated with the speed at which the impeller of the fan rotates. For example, fan settings may include a high setting, a first low setting, and a second low setting. The second low setting may be associated with a lower fan speed than the first low setting. For example, a fan may allow operation at 800 RPM (rotations per minute), 650 RPM, and/or 330 RPM. In some implementations, a fan may include a low setting and more than one high setting.

The compressors 120, 130 of the air conditioner may include any appropriate arrangement of compressors (e.g., in series and/or in parallel). The compressors 120, 130 may include one or more tandem compressor systems. A tandem compressor system may allow more than one compressor (e.g., compressor A 120 and compressor B 130) to share discharge lines and suction lines.

Compressor A 120 and/or compressor B 130 may include single stage and/or multi-stage (e.g., more than one stage, such as two stage, three stage, and/or variable) compressors. Compressor A 120 and Compressor B may be independently operable, in some implementations. For example, compressor A 120 may be allowed to operate and compressor B may be restricted from operation. Operations of the compressor may include full load operations and part load operations. A full load operation may include operation of each compressor of the air conditioner. A part load operation may include allowing operation of one or more compressor and restricting operation of one or more compressor. For example, a part load operation may allow one compressor to operate and restrict operation of the other compressors. In some implementations, a part load operation may include operation of a multistage compressor at one of the low settings (e.g., when a compressor includes a high setting and at least one low setting).

Compressor(s) may include a lubricating fluid that includes one or more oils, in some implementations. The lubricating fluid may include a portion of the refrigerant being compressed by the compressor, in some implementations. For example, in some implementations, a portion of the refrigerant may condense in the compressor and the condensed refrigerant may mix with the oil in the lubricating fluid (e.g., based on miscibility properties of the refrigerant and/or oil).

The lubricating fluid (e.g., oil in the fluid) may provide lubrication for one or more of the moving parts of the compressor. The lubricating fluid may be maintained at an oil viscosity range (e.g., above a minimum predetermined oil viscosity, based on for example, manufacturer recommendations) during operation of the air conditioner, in some implementations. The viscosity of the lubricating fluid may be based at least partially on the type of refrigerant and/or the temperature of the oil. For example, when the temperature of the oil decreases (e.g., due to ambient temperature, compressor inactivity and/or part load operation) and the lubricating fluid viscosity drops below the oil viscosity range, the oil may be come diluted and/or may not provide proper lubrication of the moving components of the compressor.

Crankcase heater(s) may be associated with one or more of the compressors of the air conditioner, in some implementations. As illustrated, compressor A 120 and/or compressor B 130 may include crankcase heaters 125, 135. A crankcase heater may be disposed in a housing of the compressor, in some implementations. A crankcase heater may provide heat to a portion of a compressor (e.g., the crankcase of a compressor). Heat delivered to the compressor may increase the sump temperature of the compressor. By delivering heat to the crankcase of the compressor, the crankcase heater may inhibit refrigeration migration, inhibit mixing between the refrigerant and the oil, and/or inhibit condensation of refrigerant in the crankcase. For example, when the compressor 110 has been turned off for a period of time, the temperature of the refrigerant in the compressor (e.g., sump temperature) may be low and so the crankcase heater may be utilized to increase the temperature of the refrigerant in the crankcase and inhibit mixing with the oil (e.g., lubricating fluid) of the compressor. In various implementations, the air conditioner may utilize the crankcase heater during operations at ambient temperatures in a low ambient temperature range (e.g., below approximately 65 degrees Fahrenheit, below approximately 62 degrees Fahrenheit, and/or from approximately 62 degrees Fahrenheit to approximately 45 degrees Fahrenheit).

The air conditioner may include an expansion device 150, as illustrated. The expansion device may include any device that at least partially expands refrigerant passing through the device. For example, the expansion device 150 may include a thermal expansion valve, an orifice, and/or an electronic expansion valve.

The air conditioner may include one or more sensors. For example, a first sensor may be disposed proximate an outdoor portion (e.g., condenser and/or compressor). The first sensor may measure a temperature proximate an outdoor portion, such as proximate a portion of the condenser and/or compressors. Second sensor(s) may be disposed proximate inlet line(s) of the compressor(s). The second sensor may measure a suction pressure (e.g., pressure proximate an inlet of the compressor(s)).

A third sensor(s) may be disposed proximate a sump of a compressor. The third sensor(s) may measure a compressor sump temperature (e.g., temperature of liquid, such as oil and/or refrigerant, in the compressor). For example, the third sensor may be disposed outside the compressor housing and adapted to measure the compressor temperature proximate the bottom or sump of the compressor. The third sensor may be disposed in the compressor and may be adapted to measure the sump temperature of the compressor (e.g., by being disposed in or proximate the liquid of the compressor). The position of the third sensor may include any appropriate position that allows direct or indirect measurement of the compressor sump temperature. For example, by measuring the temperature of the housing of the compressor in an area proximate liquid (e.g., lubricating fluid) in the compressor, the compressor sump temperature may be indirectly measured.

A controller 180 (e.g., a computer) may be coupled (e.g., communicably, such as by wires or linked by Wi-Fi) to component(s) of the air conditioner 100 and control various operations of the component(s) and/or system. For example, the controller 180 may include modules (e.g., instructions executable by the processor), such as an operation module and/or compressor management module, stored in a memory of the controller and executable by a processor of the controller, to perform various operations of the air conditioner 100. The operation module may control operations of the air conditioner 100, such as receiving requests for operation, determining whether to respond to requests for operation, operating various components (e.g., compressors, reversing valves, and/or expansion valves), etc. The compressor management module may determine properties of the compressor, (e.g., compressor sump temperatures, temperature differentials, suction pressure, and/or ambient temperature), determine suction saturated temperature(s), determine refrigerant coefficients, determined temperature differentials, determine air conditioner operations (e.g., compressor and/or crankcase operations) based at least partially on temperature differentials, retrieve associations (e.g., among oil viscosities, suction pressures, and/or compressor sump temperature), retrieve ranges, retrieve predetermined values (e.g., maximum suction pressure, low ambient temperature ranges, maximum suction pressure, second maximum suction pressure, and/or functions). For example, the compressor sump temperature may be determined; the suction pressure may be determined; operations of the air conditioner may be determined based on the compressor sump temperature, a determined temperature differential (e.g., between a compressor sump temperature and a minimum compressor sump temperature and/or between a compressor sump temperature and a suction saturated temperature) and the suction pressure; and/or any other appropriate operation. In some implementations, a processor executing instructions such as the compressor management module may allow air conditioner and/or refrigeration system operations; allow a first period of time to elapse; determine suction pressure; determine whether the determined suction pressure is greater than a predetermined maximum suction pressure; and/or reduce speed(s) of evaporator fan(s) if the determined suction pressure is greater than the predetermined maximum suction pressure. The instructions, such as the compressor operation module, may determined (e.g., when executed by the processor) the number of reductions and/or the amount of reductions in response to a determination that the determined suction pressure is greater than the predetermined maximum suction pressure.

The controller 180 may include a memory storing the module(s) (e.g., instructions executable by a processor) and/or other data. For example, the memory may store associations, formulas, predetermined values, etc. The memory may store instructions such as module(s). The controller 180 may retrieve the modules from the memory and allow the controller (e.g., via the processor) to perform operations by executing (e.g., using the processor of the controller) the retrieved modules. For example, the controller may determine properties of a system, such as an air conditioner by allowing a processor to execute retrieved instructions that provide operations for determining properties of a system. The controller may perform other operations by similarly retrieving instructions that provide operations for determining and/or allowing other operations of the system.

Although FIG. 1 illustrates an implementation of an air conditioner, other implementations may be utilized as appropriate. For example, the air conditioner may include any component, as appropriate. In some implementations, the expansion device may include more than one expansion device. The air conditioner may include a thermal expansion device and/or fixed orifice. The air conditioner may include more than two compressors (e.g., a tandem compressor with four compressors). The air conditioner may include one compressor with more than one stage (e.g., two stage, three stage, and/or variable stage). The air conditioner may include a heat pump and may include a reversing valve to allow cooling and heating operations. The fans 160 and/or the fans 170 may include a different number or the same number of fans. The fans 160 and/or the fans 170 may include more than three fans. In some implementations, the fans 160 and/or the fans 170 may include less than three fans, such as one fan. A fan may include more than one setting, in some implementations. For example, a fan may include at least one high setting and one o more lower settings, wherein the lower settings allow the fan to operate at a lower number of revolutions per minute than at least one of the high settings. In some implementations, one or more of the compressors may not include a crankcase heater. In some implementations, similar systems and/or processes may be utilized with refrigeration systems.

In some implementations, a portion of the air conditioner 100 may be disposed outside a building (e.g., an "outdoor portion" on the ground proximate a building and/or on a roof of the building) and a portion of the air conditioner may be disposed inside the building (e.g., an "indoor portion"). For example, the outdoor portion may include condenser 110 and fans 160 and the indoor portion may include the evaporator 140 and fans 170. In some implementations, such as a rooftop unit, the condenser 110, fans 160, compressor A 120, crankcase heater 125, compressor B 130, crankcase heater 135, evaporator 140, fans 170, and the expansion device 150 may be disposed in the outdoor portion. In some implementations, an ambient temperature may be determined by determining a temperature proximate a portion of the air conditioner, such as the outdoor portion, a compressor, and/or a condenser. The outdoor and/or indoor portion may be at least partially disposed in housing(s).

During a cooling cycle of the air conditioner 100, cool air may be provided by blowing air (e.g., from fans 170) at least partially through the evaporator 140. The evaporator 140 may evaporates liquid refrigerant in the evaporator. The evaporator may reduce a temperature of the air and the cool air may be provided to a location (e.g., via ducting). The gaseous refrigerant may exit the evaporator 140, and may be compressed by compressor A 120 and compressor B 130, and delivered to a condenser 110. The condenser 110 may condense the gaseous refrigerant by blowing air (e.g., from a fans 160) at least partially through the condenser 130 to remove heat from the gaseous refrigerant.

During air conditioner operations, for example at low ambient temperatures (e.g., ambient temperatures in a low ambient temperature range, such as less than approximately 62 degrees Fahrenheit), the compressor(s) may operate at part load (e.g., a compressor may operate at a low setting and/or operation of at least one of the compressors may be restricted while other compressor(s) are allowed to operate). When the compressor(s) operate at part load, the sump temperature of one or more of the restricted operation compressors (e.g., off and/or operation at a low setting) may decrease (e.g., when compared to full load operations). The temperature drop (e.g., the compressor sump temperature) may affect the oil viscosity. When the oil viscosity is not within an oil viscosity operational range and/or when the compressor sump temperature is less than a minimum compressor sump temperature, the performance of the oil (e.g., in the lubricating fluid) in the compressor may decrease (e.g., due to oil breakdown, oil migration and/or oil dilution may occur). When the performance of the oil decreases, the performance of the compressor may decrease. Thus, operations of the compressors of the air conditioner may be managed by maintaining the oil viscosity.

In some implementations, the air conditioner may include a heat pump in which the heat exchangers of the system are capable of operating as the condenser or the evaporator based a setting of the air conditioner. For example, a reversing valve may be actuated such that the evaporator 140 operates as a condenser and the condenser 110 operates as an evaporator.

FIG. 2A illustrates an implementation of an example process 200 for managing compressor operations by maintaining oil viscosity. A compressor sump temperature and a suction pressure of compressor(s) of an air conditioner may be determined (operation 205). For example, sensors may be disposed proximate the compressor such that the compressor sump temperature and/or the suction pressure may be determined. In some implementations, the compressor sump temperature and/or the suction pressure may be associated with a compressor. In some implementations, the sensor(s) may transmit signals (e.g., based on measurements) to the controller of the air conditioner, which determines the compressor sump temperature and the suction pressure.

Oil viscosity of compressor(s) may be maintained in a predetermined operating range based at least partially on the determined compressor sump temperature and/or determined suction pressure (operation 210). For example, one or more operations of the air conditioner may be altered to adjust the compressor sump temperature and/or the suction pressure. For example, fan speed(s), operation(s) of the compressor(s), operation(s) of crankcase heater(s), and/or other operation(s) of the air conditioner may be adjusted. Since the oil viscosity (e.g., oil viscosity and/or oil dilution with refrigerant) varies with temperature and/or pressure, by adjusting the compressor sump temperature and/or the suction pressure, the oil viscosity may be adjusted. Thus, one or more operations of the air conditioner may be adjusted to maintain the compressor sump temperature, a temperature differential based on the compressor sump temperature, and/or the suction pressure in range(s), which may keep the oil viscosity in a predetermined operating range, and which may allow management of the compressor operations.

Process 200 may be implemented by various systems, such as system 100. In addition, various operations may be added, deleted, and/or modified. For example, the suction pressure may be associated with more than one compressor. For example, a tandem compressor may include an inlet that provides fluid (e.g., refrigerant) to more than one compressor and the suction pressure may be measured proximate the inlet. In some implementations, the predetermined operating range may be based at least partially on refrigerant manufacturer specifications, air conditioner specifications, company specifications, industry specifications, and/or government specifications.

FIG. 2B illustrates an implementation of an example process 250 for managing compressor operations by maintaining oil viscosity. A temperature differential based at least partially on the compressor sump temperature may be determined (operation 255). Sensor(s) may be coupled to an air conditioner to monitor one or more properties. The sensor(s) may transmit signals (e.g., based on measurements) to the controller of an air conditioner. For example, sensors may be disposed proximate the compressor such that the compressor sump temperature may be determined. The controller (e.g., a processor of the controller executing instructions stored in the memory) may determine a temperature differential based at least partially on the compressor sump temperature. For example, the temperature differential may be the difference between the compressor sump temperature and a minimum sump temperature (e.g., determined from a table of associations, an algorithm, etc.) and/or the difference between the compressor sump temperature and a suction saturated temperature.

Operations of the air conditioner may be managed to maintain oil viscosity of compressor(s) in an operating range based at least partially on the temperature differential (operation 260). The controller of an air conditioner, for example, may determined whether to adjust and/or maintain operations of the air conditioner based on the temperature differential. When the temperature differential is less than a predetermined temperature differential minimum value, operation(s) of the air conditioner may be adjusted, in some implementations. For example, one or more operations of the air conditioner may be altered to adjust the compressor sump temperature and/or the suction pressure. For example, fan speed(s), operation(s) of the compressor(s), operation(s) of crankcase heater(s), and/or other operation(s) of the air conditioner may be adjusted. The controller of the air conditioner may determine which operations to adjust based on the type of temperature differential utilized. For example, a fan speed may be adjusted when the temperature differential is determined as a difference the compressor sump temperature and a determined minimum sump temperature. A crankcase heater and/or compressor operation may be adjusted when a temperature differential is determined based on the difference between the compressor sump temperature and a suction saturated temperature. In some implementations, since the suction pressure is related to the saturated suction temperature, use of the saturated suction temperature in the temperature differential may utilize indirectly the suction pressure in the control of compressor operations. In some implementations, more than one temperature differential may be utilized to manage the operation of the air conditioner and one or more temperature differentials may be associated with controlling the operation of one or more components of the air conditioner.

Process 250 may be implemented by various systems, such as system 100. In some implementations, process 250 may be performed in combination with other processes such as process 200. In addition, various operations may be added, deleted, and/or modified. For example, a minimum temperature differential may be determined based at least partially on associations between a suction pressure, oil viscosity, compressor sump temperature and/or temperature differentials. The air conditioner (e.g., a controller) may compare the determined minimum temperature to the temperature differential based on operation of the air conditioner to determine whether to adjust and/or maintain operation(s) of the air conditioner. In some implementations, the operating range may be based at least partially on refrigerant manufacturer specifications, air conditioner specifications, company specifications, industry specifications, and/or government specifications.

In some implementations, the operation(s) of compressor(s) and/or crankcase heaters may be utilized to maintain oil viscosity. For example, when compressor(s) are allowed to operate, a compressor sump temperature may be increased by the operation. For example, when a compressor is restricted from operating (e.g., during part load), the temperature of the refrigerant in the compressor may decrease. As the temperature of the refrigerant decreases, the refrigerant may migrate and mix with the oil in the compressor. As the temperature of the refrigerant decreases, the viscosity of the oil and/or lubricating fluid may decrease based at least partially on the temperature drop. Thus, oil dilution (e.g., due to temperature drop and/or refrigerant migration) may occur. When a crankcase heater is utilized, a temperature of the oil may be increased. As the temperature of the oil is increased, a viscosity of the oil may increase and oil dilution may be inhibited.

FIG. 3 illustrates an implementation of an example process 300 for managing compressor operations. When compressor operations are not managed, performance (e.g., efficiency, cost minimization, and/or reliability) of the compressor and/or air conditioner may not be able to be maintained across varying operating conditions. For example, refrigeration migration into the lubricating fluid (e.g., compressor oil) may be increased.

A compressor sump temperature and a suction pressure of compressor(s) may be determined (operation 305). The air conditioner may include sensors that allow properties of the compressor to be determined. Sensor(s) coupled proximate the compressor may measure the compressor sump temperature and/or the suction pressure of the compressor. For example, sensor(s) may be disposed proximate an inlet of the compressor(s) to measure suction pressure. Sensor(s) may be disposed in the compressor to determine compressor sump temperature. The sensor(s) may transmit the measurements to the controller and/or the measurements may be stored in a memory of the controller. The measurements may be utilized (e.g., by a module of the controller to determine the compressor sump temperature, suction pressure, and/or other properties of the air conditioner).

A suction saturated temperature may be determined at least partially on the determined suction pressure (operation 310). A first formula for determining the suction saturated temperature may be retrieved (e.g., from a memory of the controller). The first formula may be based on properties of the refrigerant. In some implementations, the first formula may relate suction saturated temperature to the suction pressure using one or more refrigerant coefficients based on one or more properties of the refrigerant. For example, the refrigerant coefficient(s) may be stored in a memory of the controller and retrieved with the first formula. The suction saturated temperature may be determined using the retrieved first formula and the determined suction pressure.

A temperature differential between the determined compressor sump temperature and the determined suction saturated temperature may be determined (operation 315). For example, the difference (e.g., absolute difference and/or relative difference) between the determined compressor sump temperature (e.g., measured by a sensor) and the determined suction saturated temperature (e.g., determined using the first formula) may be determined. This determined difference may be the temperature differential. The controller may determine the temperature differential for example, by retrieving values (e.g., previously measured compressor sump temperature and/or previously determined saturated temperature) and comparing the values.

Compressor(s) and/or crankcase heater operation(s) may be determined based at least partially on the temperature differential (operation 320). For example, the temperature differential may be compared to one or more predetermined ranges of values to determine which operations to allow. Operations may include, but are not limited to, compression operations (e.g., on, off, part load, and/or full load) and/or crankcase heaters (e.g., on, off, one of the low settings, and/or high setting), which may be adjusted based at least partially on the temperature differential.

When the temperature differential is in at least one of the ranges, crankcase heater operation may be allowed. Operation of the crankcase heater may increase the compressor sump temperature, and thus the oil viscosity in the compressor may be maintained in a predetermined operating range. When the compressor sump temperature is increase and the oil viscosity is maintained in a predetermined operating range, compressor operations may be managed to maintain performance (e.g., since oil dilution may be inhibited). In some implementations, when the temperature differential is in a lower predetermined range of values, one or more operations of compressor(s) may be adjusted. For example, since allowing operation of a compressor may increase the compressor sump temperature, the oil viscosity may be maintained in a predetermined operating range. In some implementations, allowing operation of the compressor may increase the temperature more quickly and/or may allow a greater increase in temperature than the crankcase heater operation. Thus, the operation of the air conditioner that is allowed (e.g., crankcase heater operation and/or compressor operation) may be based on the magnitude of the temperature differential.

Since operation of the crankcase heater may increase operating costs and/or decrease air conditioner efficiency (e.g., based on ratings such as IEER, integrated energy efficiency ratio), controlling the use of the crankcase heater may decrease operating costs and increase air conditioner efficiency. By controlling the operation of the crankcase heater based on the temperature differential, use of the crankcase heater may be managed to reduce usage of the crankcase heater when operations may be managed without its use.

Process 300 may be implemented by various systems, such as system 100. In addition, various operations may be added, deleted, and/or modified. In some implementations, process 300 may be performed in combination with other processes such as process 200 and/or process 250. For example, the compressor sump temperature and/or the suction pressure may be measured with other processes of the air conditioner and a previous measured for a compressor sump temperature and/or suction pressure may be retrieved from a memory of the controller to determine whether to adjust operations of the air conditioner to maintain oil viscosity. In some implementations, the refrigerant coefficients may be based at least partially on the type of refrigerant. In some implementations, the refrigerant coefficients may be based on empirical data. The first formula may include a logarithmic function, such as a natural logarithmic function.

In some implementations, the predetermined ranges, to which the temperature differential may be compared, may be stored in a memory of the controller. The controller (e.g., a module of the controller) may retrieve the ranges and/or appropriate range(s). The ranges may be based at least partially on properties of the compressor (e.g., properties of the refrigerant, such as type of refrigerant and/or mixture properties of the refrigerant; oil properties, such as type of oil and/or mixture properties of the oil; compressor specifications such as capacity and/or pressure restrictions; and/or other properties).

Figure 4:
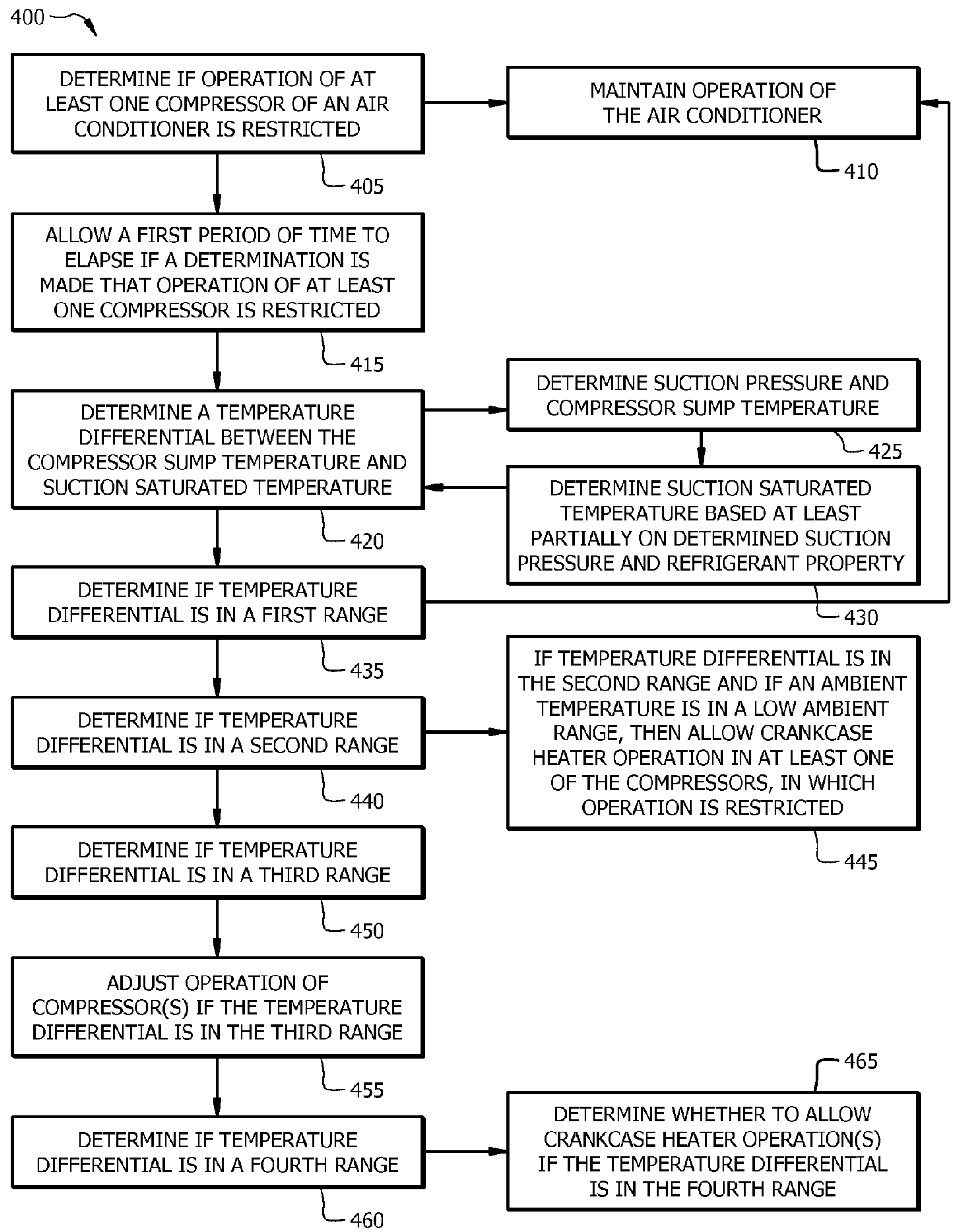
FIG. 4 illustrates an implementation of an example process for managing compressor operations oil viscosity.

FIG. 4 illustrates an implementation of an example process 400 for maintaining oil viscosity. A determination may be made whether operation of at least one compressor of an air conditioner is restricted (operation 405). A compressor may have a restricted operation when the compressor is off and/or when a multi-stage compressor is inhibited from operating at one or more of the higher stages. For example, when the compressor(s) are operating at part load, operation of at least one of the compressors may be restricted. In some implementations, operation of one or more of the other compressors, if the air conditioner includes other compressors, may be allowed. A controller may determine whether operation of at least one of the compressors of the air conditioner is restricted. For example, the controller may determine whether a compressor is a part load based on signals generated for operation of the air conditioner components in response to a request for operation).

If a determination is made that operation of at least one of the compressors is not restricted, then the operation of the air conditioner may be maintained (operation 410). For example, an air conditioner may receive a request for operation and determine operation(s) for one or more of the components (e.g., condenser, compressor, fan(s), etc.) of the air conditioner. The controller may then make a determination of whether operation of at least one compressor is restricted. If the operation of one or more of the compressors is not restricted, then adjustment of operations of the air conditioner (e.g., which are in response to the received request) may be restricted. Thus, the operations of the air conditioner may be allowed.

A first period of time may be allowed to elapse (operation 415). For example, after the controller (e.g., a processor of the controller executing instructions) determines that operation of at least one of the compressors is restricted, then the controller may allow the first period of time to elapse. The first period of time may be from approximately 0 to approximately 1 hour (e.g., 10 minutes). The first period of time may, for example, allow the air conditioner to operate at steady state and/or exclude measurements during start up and/or shut down (e.g., of a compressor) after a change in operation (e.g., full load to part load, off to part load, and/or part load to off), in some implementations.

A temperature differential between the determined compressor sump temperature and the suction saturated temperature may be determined (operation 420). The temperature differential may indicate what type of adjustment should be made to the operation of the air conditioner to maintain an oil viscosity in a predetermined operating range and/or compressor sump temperature in a predetermined operating range (e.g., less than a maximum compressor sump temperature and/or greater than a minimum compressor sump temperature). Maintaining the oil viscosity and/or compressor sump temperature in a predetermined operating range may allow compressor performance to be managed during part loads (e.g., to increase performance and/or reliability).

A suction pressure and a compressor sump temperature may be determined (operation 425). For example, first sensor(s) may be disposed proximate the inlet of the compressor(s) to measure the suction pressure. Second sensor(s) may be disposed in the compressor to determine the compressor sump temperature. The measurements from the sensors may be transmitted to the controller and the controller may determine the compressor sump temperature and/or the suction pressure. The controller may retrieve values for the suction pressure and/or sump temperature from previous measurements, in some implementations.

A suction saturated temperature may be determined based at least partially on the determined suction pressure and a refrigerant property (operation 430). The suction saturated temperature may be determined (e.g., by the controller). For example, the controller may retrieve a first formula that allows use of measured properties of the air conditioner to determine the suction saturated temperature. For example, the first retrieved property may allow suction saturated temperature to be calculated based on the determined suction property and/or properties of the refrigerant.

The controller may determine the temperature differential based on the difference (e.g., absolute and/or relative difference) between the determined compressor sump temperature and a determined suction saturated temperature. For example, the controller may determine the relative difference between the compressor sump temperature (e.g., determined from measurements) and the suction saturated temperature (e.g., determined from the first formula). The temperature differential may be saved in a memory of the air conditioner (e.g., controller).

The temperature differential may be compared to one or more predetermined ranges to determine whether to allow adjustments and/or what type of adjustments to allow to operations of the air conditioner. The predetermined ranges may be based on refrigerant properties, compressor specifications, air conditioner specifications, empirical testing of air conditioners or portions thereof, etc. The predetermined ranges may overlap and/or not overlap. The predetermined ranges may be approximately the same size and/or different sizes.

In some implementations, the predetermined ranges may be selected to provide greater adjustments (e.g., more heat provided to refrigerant and/or oil in compressor) for smaller temperature differentials. Since a smaller temperature differential may correlate to a compressor sump temperature approaching the suction saturated temperature, the amount of heat provided to inhibit the compressor sump temperature from approaching the suction temperature may be greater (e.g., to inhibit oil issues, such as oil dilution). Smaller adjustments (e.g., smaller when compared to the amount of heat provided by other adjustments) may be less expensive than larger adjustments; and thus, by utilizing the ranges to determine which adjustment to provide, the cost of the adjustments may be minimized (e.g., since smaller adjustments may be made when temperature differentials are large and larger adjustments may be made when temperature differentials are small).

A determination may be made whether the temperature differential is in a first predetermined range (operation 435). For example, the first predetermined range may include values greater than a predetermined high temperature differential. The predetermined high temperature differential may be based on a manufacturer recommendation, such as compressor operating values. For example, the high temperature differential may be approximately 25. In some implementations, the controller may retrieve a first predetermined range (e.g., from a memory of the controller). The controller may compare the temperature differential to the first predetermined range to determine whether the temperature differential is in the first predetermined range.

In some implementations, if the temperature differential is in the first predetermined range, then the operation(s) of the air conditioner may be maintained (e.g., adjustment of the operation(s) of the air conditioner may be restricted). Since the temperature differential is large when the temperature differential is in the first predetermined range, the temperature of the oil and/or refrigerant in the compressor may be in a range such that the oil viscosity may be maintained and/or migration may be inhibited. Thus, adjustment of the air conditioner may be restricted.

A determination may be made whether the temperature differential is in a second predetermined range (operation 440). For example, the second predetermined range may include values between a predetermined high temperature differential and a predetermined mid temperature differential. The predetermined high temperature differential and/or the predetermined mid differential may be based at least partially on manufacturer recommendations, such compressor manufacturer operating ranges. For example, the predetermined mid temperature differential may be approximately 21. The second predetermined range may be approximately 25 to approximately 21.

If the temperature differential is in the second predetermined range and if an ambient temperature range in a low ambient range, then an operation of a crankcase heater of at least one of the compressors, in which operation is restricted, may be allowed (operation 445). For example, if the temperature differential is between approximately 25 and approximately 21, then operation of the crank case heater may be allowed. For example, in a part load, operation of one or more first compressors may be restricted and operation of one or more second compressors may be allowed. In some implementations, the controller may retrieve a second predetermined range (e.g., from a memory of the controller). The controller may compare the temperature differential to the second predetermined range to determine whether the temperature differential is in the second predetermined range.

In some implementations, while the crankcase heater is allowed to operate one or more temperature differentials (e.g., a difference between the compressor sump temperature and the suction saturated temperature) may be determined. When the temperature differential during the crankcase heater operation is greater than a predetermined crankcase operational temperature differential, then the crankcase heater operation may be restricted (e.g., the crankcase heater may be turned off). When the temperature differential during the crankcase heater operational temperature differential is less or equal to a predetermined crankcase operational temperature differential, then the crankcase heater operation may be allowed (e.g., the crankcase heater may remain on). The predetermined crankcase heater operational temperature differential may be approximately the same as or different from the predetermined high temperature differential. In some implementations, the predetermined crankcase heater operational temperature differential may be greater than the predetermined high temperature differential. For example, the predetermined crankcase heater operational temperature differential may be approximately 30.

A determination may be made whether a temperature differential is in a third predetermined range (operation 450). For example, the third predetermined range may include values between a predetermined mid temperature differential and a predetermined low temperature differential. The predetermined mid temperature differential and/or the predetermined low differential may be based at least partially on manufacturer recommendations, such compressor manufacturer operating ranges. For example, the predetermined low temperature differential may be approximately 18. The third predetermined range may be approximately 21 to approximately 18. In some implementations, the controller may retrieve a third predetermined range (e.g., from a memory of the controller). The controller may compare the temperature differential to the third predetermined range to determine whether the temperature differential is in the third predetermined range.

An operation of compressor(s) may be adjusted if the temperature differential is in the third predetermined range (operation 455). For example, if a determination is made (e.g., by the controller) that the temperature differential is in the third predetermined range, an operation of the compressor(s) may be adjusted. When the temperature differential is in the third predetermined range, the difference between the compressor sump temperature and the suction saturated temperature may be less than when the temperature differential is in the second predetermined range. Thus, more heat may be required to maintain the oil viscosity, maintain compressor sump temperatures, inhibit oil migration, etc.

In some implementations, during when the compressor(s) are operating at part load, operation of at least one first compressor may be restricted while one or more second compressors may be allowed. If the temperature differential is in the third predetermined range, then at least one of the first compressors, in which operation was restricted, may be allowed to operate; and, at least one of the second compressors, in which operation was allowed, may be allowed to operate. By allowing operation of a first compressor, in which operation was restricted, the compressor sump temperature of the compressor may increase by an amount greater than the crankcase heater and/or may increase more cost-effectively than the crankcase heater. Thus, by allowing the compressor sump temperature to increase, oil viscosity may be maintained, refrigeration and/or oil migration may be inhibited, and/or performance of the air conditioner may be increased (e.g., when compared to other systems).

A determination may be made whether a temperature differential is in a fourth predetermined range (operation 460). For example, the fourth predetermined range may include values less than a predetermined low temperature differential. The predetermined low temperature differential may be based at least partially on manufacturer recommendations, such compressor manufacturer operating ranges. For example, the predetermined low temperature differential may be approximately 18. The fourth predetermined range may be less than approximately 18. In some implementations, the controller may retrieve a fourth predetermined range (e.g., from a memory of the controller). The controller may compare the temperature differential to the fourth predetermined range to determine whether the temperature differential is in the fourth predetermined range.

A determination may be made whether to allow crankcase heater operation(s) if the temperature differential is in the fourth predetermined range (operation 465). The controller may retrieve the fourth predetermined range and compare the determined temperature differential to the fourth predetermined range. If the temperature differential is determined to be in a fourth predetermined range, in some implementations, operation of each of the crankcase heaters of the air conditioner may be allowed. In some implementations, operation of each of the compressors may be restricted during operation of the crankcase heaters (e.g., when the temperature differential is in the fourth predetermined range). The operation of each of the crankcase heaters may be allowed for the same and/or different periods of time. For example, each of the crankcase heaters may be allowed for a second period of time, such as approximately 15 minutes. In some implementations, second temperature differentials for each of the compressors may be determined while the crankcase heaters are allowed to operate. The second temperature differential for a compressor may be compared to a second temperature for another compressor. When the difference between the second temperature differential for a compressor and the second temperature for another compressor is less than a predetermined operational temperature differential (e.g., approximately 3), the crankcase heaters may be restricted from operation.

In some implementations, the compressors may be allowed to operate after the crankcase heaters have been allowed to operate for a third period of time. The third period of time may be the time elapsed between the when the crankcase heaters were allowed to operate and when the crankcase heaters are restricted from operations. In some implementations, when the compressors are allowed to operate, operation of one or more first compressors may be restricted, where the operation of the first compressors was previously restricted during the part load operation; and, operation of the second compressors may be allow, where the second compressors were previously allowed to operate during the part load operation. In some implementations, when the compressors are allowed to operate, operation of one or more first compressors may be allowed, where the operation of the first compressors was previously restricted during the part load operation; and, operation of the second compressors may be restricted, where the second compressors were previously allowed to operate during the part load operation.

Process 400 may be implemented by various systems, such as system 100. In addition, various operations may be added, deleted, and/or modified. In some implementations, process 400 may be performed in combination with other processes such as process 200, process 250, and/or process 300. For example, a first period of time may not be allowed to elapse prior to determining a temperature differential. In some implementations, the compressor sump temperature and/or the suction pressure may be determined (e.g., by the controller) from measurements received by the controller. For example, the controller may measure one or more properties of the air conditioner to determine the compressor sump temperature and/or suction pressure.

In some implementations, the suction saturated temperature may be determined based at least partially on more than one refrigerant property.

In some implementations, the first formula may be a logarithmic function of suction pressure. For example:

$$\text{Suction Saturated Temperature}=\text{Refrigerant coefficient } A+\text{Refrigerant coefficient } B\times LN(\text{suction pressure})+\text{Refrigerant coefficient } C\times(LN(\text{suction pressure}))^2$$

where,

Refrigerant coefficient A, Refrigerant coefficient B, and Refrigerant coefficient C are based at least partially on properties of the refrigerant.

In some implementations, the air conditioner may utilized R-410A refrigerant. The first formula may include refrigerant coefficients based at least partially on the type of refrigerant utilized by the system, such as R-410A.

For example:

$$\text{Suction Saturated Temperature}=\text{Refrigerant coefficient } A+\text{Refrigerant coefficient } B\times LN(\text{suction pressure})+\text{Refrigerant coefficient } C\times(LN(\text{suction pressure}))^2$$

where,

Refrigerant coefficient A is approximately −9 to −10;

Refrigerant coefficient B is approximately −31 to approximately −32; and

Refrigerant coefficient C is approximately 8 to 9.

In some implementations, the first formula may be determined based on empirical data. For example, an air conditioner may be allowed to operate and measurements may be obtained (e.g., of suction temperature, suction pressure, refrigerant migration, etc.). The measurements may be utilized to determine a first formula that relates suction saturated temperature to suction pressure.

In some implementations, the ambient temperature (e.g., temperature proximate at least a portion of the air conditioner, such as an outdoor portion) may be determined. The ambient temperature may be compared with a low ambient temperature range. When the temperature differential is in the second predetermined range and when an ambient temperature is in a low ambient temperature range (e.g., less than a predetermined low ambient temperature, such as approximately 60 degrees Fahrenheit and/or approximately 62 degrees Fahrenheit), one or more of the crankcase heaters that is associated with first compressor(s) may be allowed to operate. If the ambient temperature is greater than the low ambient temperature range, then the operation of the crankcase heater may be restricted. For example, if the ambient temperature is greater than a low ambient temperature range, the crankcase heater operation may be restricted even when the temperature differential is in the second predetermined range.

Figure 5:
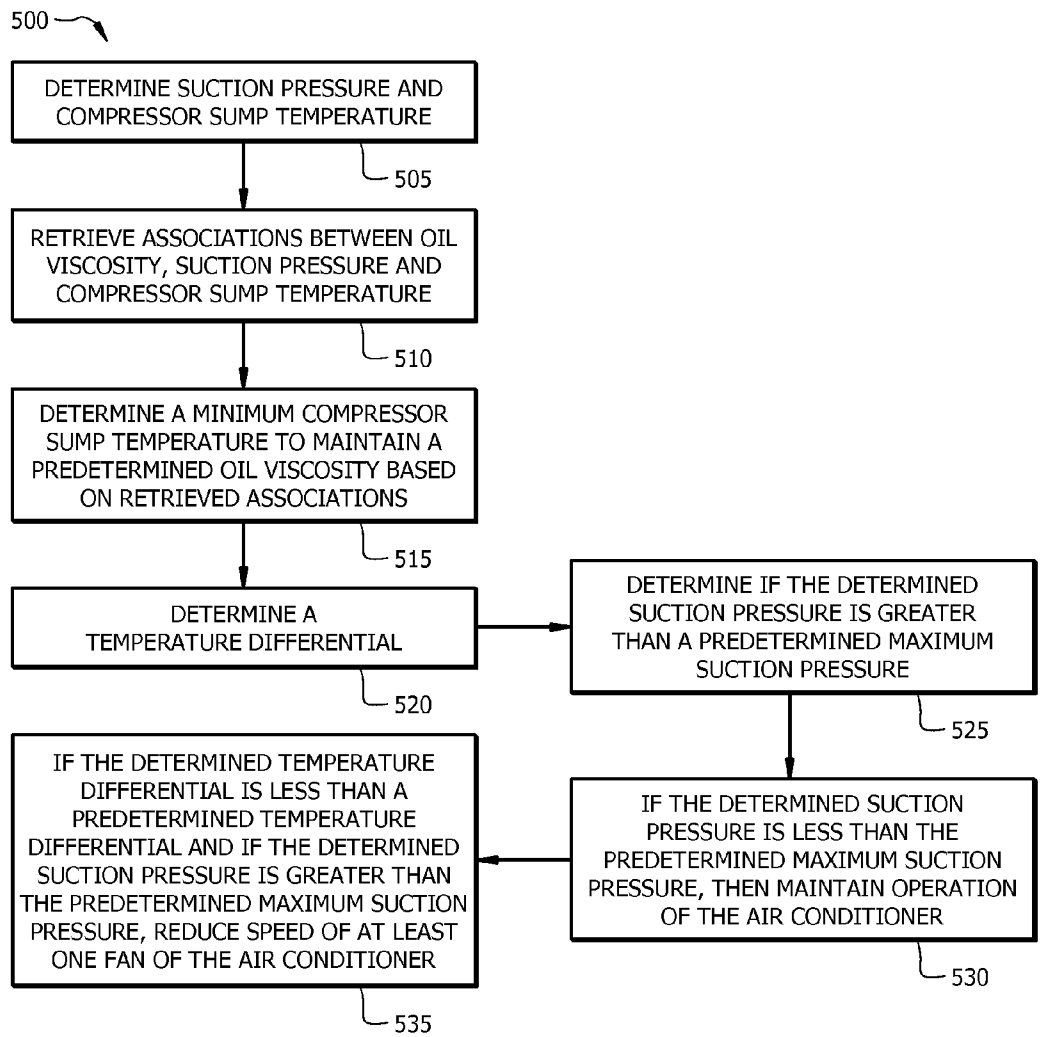
FIG. 5 illustrates an implementation of an example process for maintaining oil viscosity.

In some implementations, compressor operations may be managed by maintaining the oil viscosity in a predetermined operational range. The lubrication properties of the oil may depend on the appropriate viscosity of oil being maintained in the compressor. Thus, when the oil viscosity is maintained, in predetermined operational range oil (e.g., greater than a predetermined or determined oil viscosity minimum), oil issues (e.g., migration and/or dilution) may not substantially affect the performance of the compressor. The viscosity of the compressor(s) of the air conditioner may be maintained in an operational range by adjusting fan operations, in some implementations. FIG. 5 illustrates an implementation of an example process 500 for maintaining an oil viscosity. A suction pressure and a compressor sump temperature may be determined (operation 505). For example, sensors may measure (e.g., directly and/or indirectly) one or more properties of the air conditioner or a portion thereof (e.g., compressor) and a controller (e.g., a module executed by the processor of the controller) may determine suction pressure and compressor sump temperature based on the measurements. The controller may save the determined suction pressure and/or compressor sump temperature in a memory of the controller.

Associations between oil type, refrigerant type, miscibility properties of the oil, miscibility properties of the refrigerant, oil viscosity, suction pressure, compressor suction temperature, and a temperature differential (e.g., based on the compressor sump temperature) may be retrieved (operation 510). For example, a second formula may be retrieved. The second formula may allow a temperature differential (e.g., based on the difference between the a compressor sump temperature and a minimum compressor sump temperature) a minimum compressor sump temperature to be calculated based at least partially on suction pressure, oil properties (e.g., type of oil, mixture properties of oil, properties of refrigerant in compressor, etc.), and/or properties of the air conditioner (e.g., type of expansion device and/or compressor properties such as type and/or number).

The second formula may be a linear formula. For example:

$$\text{A minimum compressor sump temperature}=\text{oil coefficient } A+\text{suction pressure}\times\text{oil coefficient } B$$

where, oil coefficient A may be related to a minimum compressor sump temperature of the compressor (e.g., based on manufacturer specifications) to achieve a predetermined low oil viscosity, and oil coefficient B may be the ratio of (maximum compressor sump temperature of the compressor (e.g., based on manufacturer specification) minus the minimum compressor sump temperature of the compressor) to (maximum suction pressure of the compressor (e.g., based on manufacturer specification) minus the minimum suction pressure of the compressor (e.g., based on manufacturer specification).

In some implementations, the second formula may be:

$$\text{A minimum compressor sump temperature}=\text{oil coefficient } A+\text{suction pressure}\times\text{oil coefficient } B$$

where, oil coefficient A=approximately 10; and oil coefficient B=approximately ((20-10)/(155-95), where 20 is the predetermined maximum compressor sump temperature, 10 is the predetermined minimum compressor sump temperature, 155 is the predetermined maximum suction pressure, and 95 is the predetermined minimum suction pressure.

In some implementations, utilizing retrieved associations (e.g., second formula, table of associations, etc.) to determine a minimum compressor sump temperature may allow the air conditioner to adjust the minimum compressor sump temperature at which the air conditioner is allowed to operate based on operating parameters (e.g., type of oil, suction pressure, and/or other parameters). For example, a manufacturer may recommend a first recommended minimum compressor sump temperature for operation of the air conditioner across a range of operating conditions. However, by allowing the minimum compressor sump temperature to adjust based on the suction pressure, a lower minimum compressor sump temperature may be determined to maintain oil viscosity in a predetermined operating range. If a lower minimum compressor sump temperature is allowed during air conditioner operations while maintaining oil viscosity (e.g., and thus performance of the oil), then costs may be lowered (e.g., since operations to increase the oil viscosity and/or increase the compressor sump temperature may not be performed as frequently).

A minimum compressor sump temperature to maintain a predetermined oil viscosity may be determined based on retrieved associations (operation 515). The second formula may be retrieved by the controller and utilized to determine the minimum compressor sump temperature. By utilizing the association between the oil viscosity (e.g., oil viscosity and/or oil dilution) and the suction pressure, the minimum compressor sump temperature for operation at a particular suction pressure may be determined. The determined minimum compressor \temperature value may allow operation below a minimum compressor sump temperature provided by a manufacturer (e.g., in which an average minimum sump temperature and/or steady state sump temperature may be assigned the minimum sump temperature). By allowing the sump to operate at or above the determined minimum compressor sump temperature for an operational suction pressure, oil dilution and/or migration may be inhibited.

A temperature differential may be determined (operation 520). The temperature differential may be based at least partially on the difference between the determined compressor sump temperature and the determined minimum compressor sump temperature. The temperature differential may be determined by a controller (e.g., a processor of the controller) executing instructions retrieved from a memory of the air conditioner.

A determination may be made whether the determined suction pressure is greater than a predetermined maximum suction pressure (operation 525). For example, a predetermined maximum suction pressure may be retrieved from a memory of the air conditioner. The predetermined maximum suction pressure may be based at least partially on the properties of the air conditioner, such as the compressor properties (e.g., manufacturer specifications, capacity, and/or other properties) and/or oil properties. For example, the predetermined maximum suction pressure may be approximately 155 psig.

If the determined suction pressure is less than the predetermined maximum suction pressure, then operation of the air conditioner may be maintained (operation 530). For example, the predetermined maximum suction pressure (e.g., retrieved from a memory of the controller) may be determined (e.g., by a module executed by the controller) to be greater than the determined suction pressure (e.g., determined by the controller). Adjustment of the operations of the air conditioner may then be inhibited, and the operations of the air conditioner (e.g., in response to a request for operation) may be maintained.

If the determined temperature differential is less than a predetermined minimum temperature differential and if the determined suction pressure is less than the predetermined maximum suction pressure, then the speed of at least one of the fans of the air conditioner may be reduced (operation 535). For example, a fan may include a multistage fan with a high setting and at least one low setting. The fan may then reduce a speed from a high setting to at least one of the low settings (e.g., which is associated with a slower rotational speed, such as revolutions per minute, than the high setting). In some implementations, the air conditioner may include more than one fan that provides an air flow to the evaporator and/or condenser. The setting of at least one of the fans may be reduced (e.g., from high setting to at least one of the low settings, from a low setting to a lower setting, and/or from a setting to an off setting), in some implementations. In some implementations, the fan(s), of which the speed may be reduced, may be the fan(s) providing an air flow to the heat exchanger acting as the evaporator. By reducing the speed of at least one of the fans, the suction pressure may be reduced.

The air conditioner may monitor the suction pressure to identify and/or allow a reduction in the speed of one or more fans such that the suction pressure reduces to below the maximum suction pressure.

If the suction pressure is not greater than the predetermined maximum suction pressure, then operation of the air conditioner may be maintained (e.g., adjustment of the air conditioner, operating in response to a request, may be restricted). For example, the air conditioner may determine one or more signals for operation of the components of the air conditioner in response to a received request for operation. When operation of the air conditioner is maintained, adjustment to the signal(s) may be inhibited (e.g., as opposed to when adjustment is allowed and one or more of the signals may be modified by a module of the controller).

Process 500 may be implemented by various systems, such as system 100. In addition, various operations may be added, deleted, and/or modified. In some implementations, process 500 may be performed in combination with other processes such as process 200, process 250, process 300, and/or process 400. For example, rather than determining a temperature differential, a determination may be made whether the determined compressor sump temperature is greater than the determined minimum compressor sump temperature. For example, one or more of the operations may be performed in a refrigeration system. In some implementations, the determined compressor sump temperature may be compared to the determined minimum compressor sump temperature (e.g., by the controller). If the determined compressor sump temperature is greater than the determined minimum compressor sump temperature and if the determined suction pressure is less than the predetermined maximum suction pressure, then the speed of at least one of the fans of the air conditioner may be reduced.

In some implementations, the predetermined minimum temperature differential may be stored in a memory of the air conditioner. The predetermined minimum temperature differential may be approximately 1 degree Fahrenheit, in some implementations. The predetermined minimum temperature differential may be based on properties of the air conditioner, in some implementations.

Figure 6:
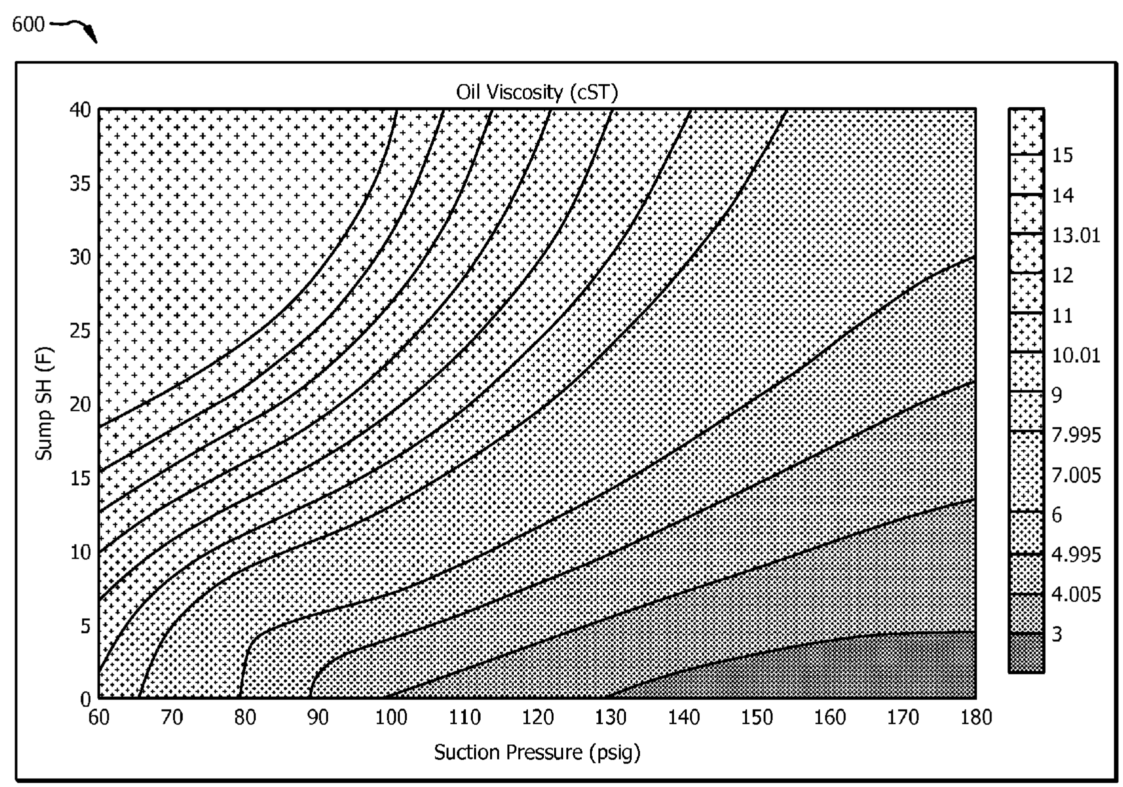
FIG. 6 illustrates an implementation of an example association between oil viscosity, compressor sump temperature, and suction pressure.

In some implementations, a minimum compressor sump temperature may be based on associations in a table of associations. In some implementations, the retrieved associations may be based on an oil viscosity curve. FIG. 6 illustrates an implementation of example associations 600 between oil viscosity (e.g., oil viscosity and/or oil dilution), compressor sump temperature, and suction pressure. As illustrated, the minimum compressor sump temperature to maintain an oil viscosity in an operating range (e.g., greater than 5 centistokes and/or less than 7 centistokes) may be identified when a suction pressure is known based on the associations 600. The associations 600 may be based at least partially on the properties of the oil (e.g., type of oil and/or mixture properties of the oil).

In some implementations, a suction pressure may not be compared to a predetermined maximum pressure. Blower speed reduction may not be utilized to reduce the suction pressure, in some implementations. For example, a minimum compressor sump temperature may be determined based on the formula and operation of the air conditioner may be maintained when a determination is made that the compressor sump temperature is greater than the determined minimum compressor sump temperature.

In some implementations, freeze stat protection may be utilized with an air conditioner. For example, a determination may be made whether the determined suction pressure is less than a predetermined low suction pressure. The predetermined low suction pressure may be based on manufacturer specifications, refrigerant properties, air conditioner properties, etc. For example, for an air conditioner with a fixed orifice as an expansion device and R-410A refrigerant, a predetermined low suction pressure may be approximately 90 psig. When the suction pressure is below the predetermined low suction pressure, then freeze stat protection operations may be allowed. Freeze stat protection operations may inhibit icing on condensers and/or fan(s) associated with condensers. Freeze stat protection operations may include restricting operation of fans, increasing evaporator fan speed, reversing refrigerant flow (e.g., in heat pumps to allow a cooling cycle which provides heated refrigerant to the condenser), and/or other operations to inhibit icing on condenser and/or fan(s) associated with the condenser.

In some implementations, an oil viscosity curve may be retrieved and the second formula may be determined based at least partially on the retrieved oil viscosity curve. For example, a function that approximates the retrieved associations may be generated. A curve-fitting algorithm may be applied to determine a second formula based on the oil viscosity curve. In some implementations, the determined second formula may be used with a plurality of air conditioners with similar components (e.g., similar refrigerant, similar oil, similar compressor(s), etc.).

In some implementations, when the compressor sump temperature is greater than the determined minimum compressor sump temperature, one or more of the operations of process 400 may be executed. For example, if the compressor sump temperature is greater than the determined minimum compressor sump temperature, the suction saturated temperature may be determined. A temperature differential may be determined based on the difference between the compressor sump temperature and the suction saturated temperature. The temperature differential may be compared to one or more predetermined ranges (e.g., first predetermined range, second predetermined range, third predetermined range, and/or fourth predetermined range) and operations of the air conditioner (e.g., compressor(s) operation(s) and/or crankcase heater(s) operation(s)) may be adjusted based on the comparison.

In some implementations, the oil viscosity associations may be utilized to manage operations of a system (e.g., compressor operations in an air conditioner and/or refrigeration system). For example, an air conditioner may be allowed to operate. The air conditioner may receive requests for operation from a user (e.g., via a thermostat) and/or based on default conditions. The air conditioner may operate based on the received requests (e.g., a processor may execute instructions such as a management module that determines operational conditions and/or settings for components). A compressor sump temperature and/or a suction pressure of an air conditioner may be determined.

In some implementations, a suction saturated temperature may be determined based at least partially on the determined suction pressure. For example, a first formula may be retrieved that allows a suction saturated temperature associated with a suction pressure to be determined based on the determined suction pressure. A temperature differential may be determined based on the difference (e.g., absolute and/or relative) between the determined compressor sump temperature and the determined saturated temperature.

In some implementations, a minimum temperature differential may be determined based at least partially on the suction pressure and the retrieved oil viscosity associations. Oil viscosity associations may be retrieved. The oil viscosity associations may include associations between oil viscosities, suction pressures, compressor sump temperatures, and/or temperature differentials. The controller (e.g., a processor of the controller executing instructions) may determine a minimum compressor sump temperature based on the retrieved oil viscosity associations. For example, using the oil viscosity associations, a compressor sump temperature associated with a suction pressure and an oil viscosity (e.g., a predetermined value for a minimum oil viscosity) may be determined. Thus, a minimum temperature differential may be determined. The minimum temperature differential may be the difference (e.g., absolute and/or relative) between the minimum compressor sump temperature and the determined suction saturated temperature (e.g., associated with the determined suction pressure).

In some implementations, the oil viscosity associations may include associations between oil viscosity, suction pressure, and minimum temperature differentials. The minimum temperature differentials may be determined based at least partially on the oil viscosity associations. For example, the determined suction pressure and a predetermined minimum oil viscosity may be utilized with the association to determine the minimum temperature differential.

The determined minimum temperature differential may be compared to the determined temperature differential. Operation(s) of the air conditioner may be managed based at least partially on the comparison between the determined minimum temperature differential and the determined temperature differential. For example, crankcase heater operation and/or compressor operation may be adjusted and/or maintained based at least partially on the comparison. In some implementations, evaporator fan(s) speed(s) may be reduced based at least partially on the comparison.

In some implementations, if the determined suction pressure is greater than a predetermined maximum suction pressure, then speed(s) of the evaporator fan(s) of the air conditioner may be reduced. For example, evaporator fan(s) may include at least one high speed and at least one lower speed. Thus, when reducing speed(s) of evaporator fan(s), operation at one of the lower speeds may be allowed. In some implementations, reducing speed(s) of evaporator fan(s) may include restricting operation of one or more fans and allowing operation of at least one fan.

In some implementations, reducing speed(s) of evaporator fan(s) may include incrementally adjusting one or more speed(s) of evaporator fan(s). For example, a fan speed may be incrementally reduced by approximately 5% up to a minimum evaporator fan speed (e.g., based on air conditioner settings, operating conditions, manufacturer specifications, etc.). The fan speed may be reduced by the increment (e.g., approximately 5%) each time the suction pressure is determined to be greater than a predetermined maximum suction pressure and/or predetermined maximum suction pressure range. The predetermined maximum suction pressure range may be utilized to inhibit overcorrection by the controller. For example, at least one second suction pressure may be determined during at least one of the incremental reductions in speed of the evaporator fan and the second suction pressure(s) may be compared to the predetermined maximum suction pressure and/or predetermined maximum second suction pressure range. Based on the comparison, the evaporator fan speed(s) may be additionally reduced and/or maintained. For example, if a second suction pressure(s) is less than the predetermined maximum suction pressure and/or predetermined maximum suction pressure range, then the evaporator fan speed(s) may be maintained. If a second suction pressure(s) is greater than the predetermined maximum suction pressure and/or predetermined maximum suction pressure, then the evaporator fan speed(s) may be reduced.

In some implementations, the crankcase heater and/or compressor operation may be managed using one or more of the operations in process 400 based on the temperature differential.

In some implementations, a second compressor sump temperature may be determined during at least one of the adjusted operations of the air conditioner, and operation(s) of the air conditioner may be adjusted such that the determined second compressor sump temperature is greater than the determined minimum compressor sump temperature. Adjusting the operation(s) of the air conditioner may include adjusting operation of compressor(s) and/or crankcase heater(s) of the air conditioner.

In some implementations, managing one or more operations of the air conditioner may include managing one or more operations of the air conditioner such that the determined temperature differential is above the determined minimum temperature differential. For example, crankcase heater(s) may be allowed to operate. By allowing operation of the crankcase heater(s), the temperature of the compressor may be increased and thus the value of the determined temperature differential may be increased. In some implementations, compressor operations may be adjusted. For example, at least one compressor, in which operation has been restricted, may be allowed to operate, and at least one compressor, in which operation has been allowed, may be restricted from operation. By allowing operation of a compressor in which operation has been restricted, the temperature of the compressor may be increased. Thus, by increasing the temperature of the compressor, the associated temperature differential may be increased. However, to reduce the usage of the crankcase heater and/or alternating compressor restriction (e.g., at least one compressor, in which operation has been restricted, may be allowed to operate, and at least one compressor, in which operation has been allowed, may be restricted from operation), the temperature differential may be compared to a minimum temperature differential determined based at least partially on the oil viscosity associations (e.g., when compared to using a fixed minimum temperature differential and/or fixed minimum compressor sump temperature). Reducing usage of the crankcase heater and/or alternating compressor restriction operations, may decrease cost and/or increase system efficiencies.

In some implementations, a determination may be made whether the determined suction pressure is below a predetermined low suction pressure; and freeze stat protection operation(s) may be allowed if the determined suction pressure is determined to be below the predetermined low suction pressure. Oil viscosity associations may include associations between oil viscosities and temperature differentials.

In some implementations, a suction pressure of the air conditioner may be controlled. For example, the suction pressure may be maintained below a predetermined maximum suction pressure and/or maintained in a predetermined operational suction pressure. For example, a predetermined maximum suction pressure and/or predetermined operational suction pressure may be based at least partially on manufacturer, industry, and/or government specifications. The predetermined maximum suction pressure and/or the predetermined operational suction pressure may be stored in a memory of the controller. During operation of the air conditioner, the suction pressure of the compressor(s) may be determined. A minimum compressor sump temperature may be determined based at least partially on the determined suction pressure. For example, based on a second formula. The determined minimum compressor sump temperature may be compared to a determined compressor sump temperature. When the compressor sump temperature is greater than the determined minimum compressor sump temperature and the suction pressure is greater than a maximum suction pressure, one or more operations of the air conditioner may be adjusted. For example, a speed of one or more of the fans of the air conditioner may be decreased. By decreasing the speed of the fan(s), the suction pressure may be decreased. When the suction pressure is decreased, the viscosity of the oil in the compressor may be increased. Thus, oil dilution may be inhibited (e.g., by maintaining a viscosity of the oil in an operating range).

Figure 7:
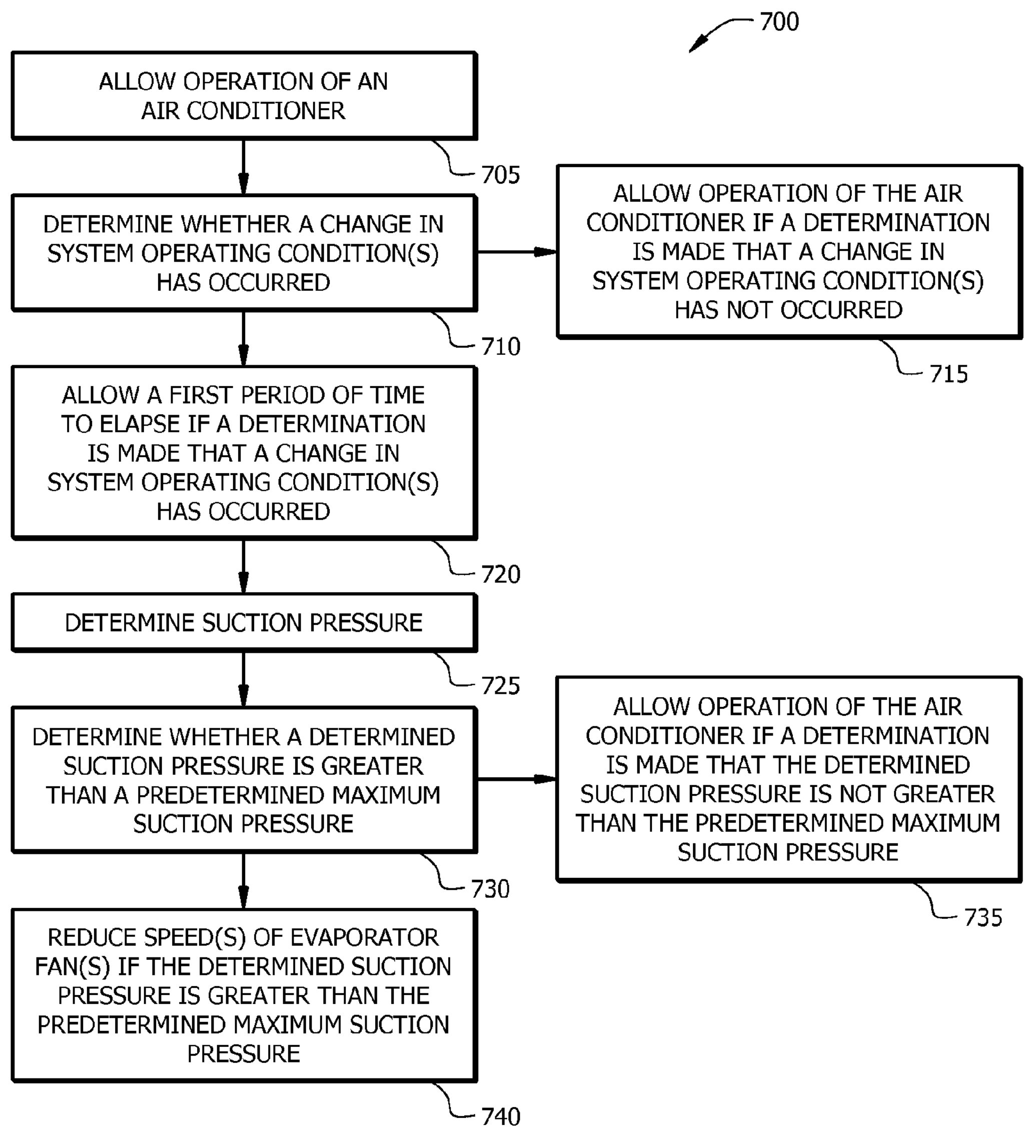
FIG. 7 illustrates an implementation of an example process for maintaining suction pressure.

In some implementations, a suction pressure of a system, such as an air conditioner, may be monitored and one or more operations of the system may be managed at least partially based on the suction pressure. FIG. 7 illustrates an implementation of an example process 700 for managing operations of an air conditioner based at least partially on suction pressure. Operation of the air conditioner may be allowed (operation 705). For example, request(s) (e.g., from a thermostat) for operation of the air conditioner may be received. The air conditioner may operate based at least partially on the received request. For example, the air conditioner may determine operating conditions, such as settings for components of the air conditioner (e.g., such as whether to allow the compressor(s) to operate at part load or full load).

A determination may be made whether a change in system operating condition(s) has occurred (operation 710). For example, the air conditioner (e.g., a controller of the air conditioner) may compare the current operating conditions to previous operating conditions (e.g., the operating conditions of the air conditioner prior to receiving the request for operation). The air conditioner (e.g., a processor of the controller executing instructions) may then determine whether a change in the system operating condition has occurred based at least partially on this comparison. A change may occur, for example, when a compressor is allowed to switch from full load to part load; a compressor is allowed to switch from a part load to a full load; a damper position is changed; fan operations change; etc.

If a determination is made that a change in system operating condition(s) has not changed, operation of the air conditioner may be allowed (operation 715). For example, the air conditioner may be allowed to continue to operate based on the received request.

If a determination has been made that a change in the system operating condition(s) has occurred, then a first period of time may be allowed to elapse (operation 720). The first period of time may be a fixed time and/or a time based on monitored properties of the system. For example, the first period of time may be from approximately 10 minutes to approximately 30 minutes. The first period of time may include the amount of time for a change in a measured property (e.g., suction pressure) to be less than a predetermined maximum change. For example, when operating conditions of the air conditioner change, it may take a period of time for the properties of the air conditioner to stabilize or approximately stabilize. This period of time may be allowed to elapse prior to allowing one or more of the other operations to avoid further changes in the operating conditions based on temporary conditions. For example, a pressure may temporarily spike and return to a lower pressure during an operation change. To avoid changing operating conditions based on the temporary spike, the air conditioner may allow the pressure to stabilize (e.g., by measuring pressure and waiting a period of time for the change in pressure to be less than a predetermined maximum change value).

A suction pressure of the air conditioner may be determined (operation 725). For example, a sensor may be disposed proximate the suction line and/or inlet of the compressor to determine the suction pressure of the air conditioner. The sensor may provide a measurement, which is transmitted to the controller of the air conditioner. The suction pressure may be determined from the measurement of the sensor.

A determination may be made whether the determined suction pressure is greater than a predetermined maximum suction pressure (operation 730). The controller (e.g., a processor of the controller executing instructions) may retrieve the predetermined maximum pressure from a memory of the air conditioner. The determined suction pressure may be compared to the retrieved predetermined maximum pressure to determine if the determined suction pressure is greater than the predetermined maximum pressure. Allowing the air conditioner to operate at suction pressures greater than the predetermined maximum pressure may increase wear on components, decrease reliability, and/or cause failures (e.g., tripping high pressure switches) of the air conditioner.

If the determined suction pressure is not greater than the predetermined maximum pressure, then the air conditioner may be allowed to operate (operation 735). The air conditioner operations and/or operating conditions may be maintained. Thus, for example, the air conditioner may continue to operate based at least partially on the received request.

If the determined suction pressure is greater than the predetermined maximum pressure, then speed(s) of one or more of the evaporator fan may be reduced (operation 740). The fan speed(s) of one or more evaporator fans may be adjusted if the suction pressure is greater than the predetermined maximum pressure. For example, the fan speed may be reduced. By reducing the fan speed, the suction pressure may be decreased.

Process 700 may be implemented by various systems, such as system 100. In addition, various operations may be added, deleted, and/or modified. In some implementations, process 700 may be performed in combination with other processes such as process 200, process 250, process 300, process 400 and/or process 500. For example, a determination may not be made whether a change in operating condition has occurred. In some implementations, a suction pressure may be determined and operations of a fan may be adjusted based on the suction pressure. In some implementations, an amount of time may not be allowed to elapse prior to determining suction pressure.

In some implementations, the predetermined maximum suction pressure may be include a variability coefficient. For example, the predetermined maximum suction pressure may be a predetermined suction pressure (e.g., 155 psig) retrieved from a memory of the controller plus a variability coefficient (e.g., 5 psig). In order to avoid overcorrection and the effects of hysteresis, the variability coefficient may be utilized.

In some implementations, the adjusting setting of the evaporator fan may be maintained until another change in operating condition (e.g., another call) is determined. For example, when a new request for operation is received, the setting of the evaporator fan may be adjusted based on the new request. When a received request has been satisfied, the operating conditions may change (e.g., since operation of the air conditioner may be restricted or turned off in response), and the setting of the evaporator fan may then be changed.

In some implementations, adjusting the setting(s) of the evaporator fan(s) may include allowing a first reduction in a first set of evaporator fans and determining a second suction pressure, which is measured after the first reduction. A determination may be made whether the second suction pressure is greater than the predetermined maximum suction pressure. If the second suction pressure is greater than the predetermined maximum suction pressure, a second reduction in a second set of evaporator fans may be allowed. The first reduction and the second reduction may be the same or different. The first set of evaporator fans and the second set of evaporator fans may be the same or different. One or more additional suction pressures may be determined and/or one or more additional reductions may be allowed for one or more of the evaporator fans and/or sets of evaporator fans based on the determined additional suction pressure(s). For example, an evaporator fan speed may be incrementally reduced by approximately 5 percent each time a determined suction pressure is greater than a predetermined maximum suction pressure. In some implementations, a speed of an evaporator fan may be inhibited from being less than a predetermined minimum evaporator fan speed (e.g., based on manufacturer specifications, operating conditioner, etc.).

In some implementations, one or more adjustments to the settings of the evaporator fan(s), such as a reduction in speed, may be allowed until a suction pressure is determined to be less than a predetermined second maximum suction pressure. The predetermined second maximum suction pressure may be less than the predetermined maximum suction pressure. For example, the predetermined maximum suction pressure may be approximately 160 psig and the second predetermined maximum suction pressure may be approximately 150 psig.

In some implementations, when determining whether a change in system operating condition(s) has occurred, the controller may determine the type of change. Some types of changes in operating condition may trigger determining suction pressure and other types of changes may not trigger determining suction pressure. For example, when changes in operating conditions that affect suction pressure (e.g., change in compressor function) are detected by the controller, then first period of time may be allowed to elapse and the suction pressure may be determined. The controller may determine whether the type of change affects suction pressure by retrieving a listing of changes that affect suction pressure (e.g., from a memory of the system) and comparing the listing to the determined change. In some implementations, if the determine change is on the listing then first period of time may be allowed to elapse and the suction pressure may be determined; and if the determined change is not on the listing, then the air conditioner may be allowed to operate; and/or vice versa.

Although the various operations have been described with respect to an air conditioner, one or more features of the air conditioner system and operations may be utilized with other systems, such as a refrigeration system. For example, a refrigeration system may include a condenser, compressor(s), and evaporator that operate to maintain a predetermined set point temperature in a location (e.g., refrigeration room or box). The refrigeration system may operate in part load based on the difference between the temperature of the location and the predetermined set point temperature. During part load operations and/or other operations, one or more of the described operations may be performed to maintain oil viscosity in a predetermined oil viscosity range.

In various implementations, a lubricating fluid such as oil (e.g., compressor oil) may include refrigerant. During operation of the system, refrigerant in the compressor may mix with the oil provided as lubricating fluid for the compressor. Thus oil viscosities may refer to the viscosity of a fluid mixture containing oil and refrigerant. Oil association tables may relate oil viscosity to other properties, in which the referenced oil viscosity relates to the viscosity of the lubricating fluid that includes oil. Oil may refer to a mixture of oil and refrigerant and/or oil diluted by refrigerant.

Although a specific controller has been described in FIG. 1, the controller may be any appropriate computer or other programmable logic device. The controller may include a processor that executes instructions (e.g., modules) and manipulates data to perform operations of the controller. Processor may include a programmable logic device, a microprocessor, or any other appropriate device for manipulating information in a logical manner and memory may include any appropriate form(s) of volatile and/or nonvolatile memory, such as RAM and/or Flash memory.

The memory may include data, such as predetermined property values (e.g., minimum compressor sump temperatures, maximum compressor sump temperatures, maximum suction pressures, and/or minimum suction pressures); predetermined properties of low ambient temperature; low ambient temperature ranges, operational range for oil viscosities; first predetermined ranges; second predetermined ranges; third predetermined ranges; fourth predetermined ranges; predetermined high temperature differentials; predetermined mid temperature differentials; predetermined low temperature differentials; first periods; second periods; third periods; first formulas; second formulas; associations; oil viscosity associations; and/or any other data useful to the operation of the air conditioner.

In addition, various software may be stored on the memory. For example, instructions (e.g., operating systems and/or other types of software), an operation module and/or compressor management modules may be stored on the memory. The operation module may operate the air conditioner and/or components thereof during normal operations (e.g., operations in which the system operates based at least partially on user requests for operation). The compressor management module may perform one or more of the operations in processes 200, 300, 400, 500, portions thereof, and/or combinations thereof. For example, the compressor management module may determine properties; retrieve predetermined property values and/or ranges of values; compare values; determine compressor settings, crankcase heater settings, and/or crankcase heater settings; determine whether to adjust air conditioner operations based on low ambient temperature; determine whether to retrieve a table of associations and/or formulas; and/or other operations.

In some implementations, modules may be combined, such as into a single module or multiple modules. Operation modules and/or compressor management modules may be distinct modules. In an implementation, operation modules and/or compressor management modules may include various modules and/or sub-modules.

A communication interface may allow the controller to communicate with components of the heat pump, other repositories, and/or other computer systems. The communication interface may transmit data from the controller and/or receive data from other components, other repositories, and/or other computer systems via network protocols (e.g., TCP/IP, Bluetooth, and/or Wi-Fi) and/or a bus (e.g., serial, parallel, USB, and/or FireWire). Operations of the heat pump stored in the memory may be updated and/or altered through the communication via network protocols (e.g., remotely through a firmware update and/or by a device directly coupled to the controller).

The controller may include a presentation interface to present data to a user, such as though a monitor and speakers. The presentation interface may facilitate receipt of requests for operation from users.

A client (e.g., control panel in field or building) may allow a user to access the controller and/or instructions stored on the controller. The client may be a computer system such as a personal computer, a laptop, a personal digital assistant, a smart phone, or any computer system appropriate for communicating with the controller. For example, a technician may utilize a client, such as a tablet computer, to access the controller. As another example, a user may utilize a client, such as a smart phone, to access the controller and request operations.

Although FIG. 1 provides one example of controller that may be used with the disclosure, controller can be implemented through computers such as servers, as well as a server pool. For example, controller may include a general-purpose personal computer (PC) a Macintosh, a workstation, a UNIX-based computer, a server computer, or any other suitable device. In some implementations, a controller may include a programmable logic device. For example, the controller may be mounted to a wall of a location in which air conditioning may be provided. According to one implementation, controller may include a web server. Controller may be adapted to execute any operating system including UNIX, Linux, Windows, or any other suitable operating system. Controller may include software and/or hardware in any combination suitable to provide access to data and/or translate data to an appropriate compatible format.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system, including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable signal(s) may be non-transitory waves and/or non-transitory signals.

Although mechanical failure and mechanical failure events have been described as conditions that cause mechanical failure, conditions that precede mechanical failure may also be included, such as excessive wear on parts.

Although users have been described as a human, a user may be a person, a group of people, a person or persons interacting with one or more computers, and/or a computer system.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a crankcase heater" includes a combination of two or more crankcase heater and reference to "a refrigerant" includes different types and/or combinations of refrigerants.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method of managing air conditioner operations, the method comprising:

determining a compressor sump temperature of an air conditioner;

determining a suction pressure of the air conditioner;

determining suction saturated temperature based at least partially on the determined suction pressure;

determining a temperature differential based on the difference between the determined compressor sump temperature and the determined suction saturated temperature;

retrieving oil viscosity associations, wherein the oil viscosity associations includes associations between oil viscosities, suction pressures, and compressor sump temperatures;

determining a minimum temperature differential based at least partially on the suction pressure and the retrieved oil viscosity associations; and managing one or more operations of the air conditioner based at least partially on the determined minimum temperature differential and the determined temperature differential.

2. The method of claim 1 wherein managing one or more operations of the air conditioner comprises managing one or more operations of the air conditioner such that the determined temperature differential is above the determined minimum temperature differential.

3. The method of claim 1 wherein managing one or more operations of the air conditioner comprises reducing a speed of one or more fans of an evaporator of the air conditioner if the determined suction pressure is greater than a predetermined maximum suction pressure.

4. The method of claim 3 wherein at least one of the fans comprises at least one high speed and at least one lower speed, and wherein reducing a speed of one or more of the fans comprises allowing operation at one of the lower speeds.

5. The method of claim 1 further comprising determining if the determined temperature differential is less than the determined minimum temperature differential, and wherein managing one or more operations of the air conditioner comprises:

if the determined temperature differential is less than the determined minimum temperature differential, adjusting one or more operations of the air conditioner; and determining a second compressor sump temperature during at least one of the adjusted operations of the air conditioner;

wherein one or more operations of the air conditioner are adjusted such that the determined second compressor sump temperature is greater than the determined minimum compressor sump temperature.

6. The method of claim 5 wherein adjusting one or more of the operations of the air conditioner comprises at least one of:

adjusting operation of one or more compressors of the air conditioner or adjusting operation of one or more crankcase heaters of the air conditioner.

7. The method of claim 1 further comprising:

determining whether the determined suction pressure is below a predetermined low suction pressure; and allowing one or more freeze stat protection operations if the determined suction pressure is determined to be below the predetermined low suction pressure.

8. The method of claim 1 wherein oil viscosity associations includes associations between oil viscosities and temperature differentials.

9. A method of managing air conditioner operations, the method comprising:

determining a compressor sump temperature of an air conditioner;

determining a suction pressure of the air conditioner;

determining a suction saturated temperature based at least partially on a refrigerant coefficient and the determined suction pressure;

determining a temperature differential, wherein the temperature differential comprises the difference between the determined compressor sump temperature and the determined suction saturated temperature;

determining, based at least partially on the temperature differential, whether to adjust operations of at least one of:

one or more compressors;

or one or more crankcase heaters; and if a determination is made to adjust operations based at least partially on the temperature differential, adjusting operations of at least one of:

one or more of the compressors;

or one or more of the crankcase heaters.

10. The method of claim 9 further comprising:

determining whether one or more compressors of the air conditioner are operating at part load; and determining the suction saturated temperature based at least partially on a refrigerant coefficient and the determined suction pressure if one or more of the compressors are determined to operate at part load.

11. The method of claim 9 further comprising:

determining whether one or more compressors of the air conditioner are operating at part load; and allowing a first period of time to elapse if one or more of the compressors are determined to operate at part load;

wherein the compressor sump temperature and the suction pressure are determined after allowing the first period of time to elapse.

12. The method of claim 9 further comprising:

comparing the determined temperature differential to a first predetermined range, wherein the first predetermined range comprises values greater than a predetermined high value; and if the temperature differential is determined to be in the first predetermined range, restricting operation of a crankcase heater associated with a compressor in which operation is restricted.

13. The method of claim 9 further comprising:

comparing the determined temperature differential to a second predetermined range, wherein the second predetermined range includes values from a predetermined high value to a predetermined mid value; and determining an ambient temperature;

determining whether the ambient temperature is in a first low ambient temperature range; and if the temperature differential is in the second predetermined range and if the ambient temperature is in the first low ambient temperature range, allowing operation of one or more crankcase heaters associated one or more compressors, in which operation is restricted.

14. The method of claim 9 further comprising:

comparing the determined temperature differential to a third predetermined range, wherein the third predetermined range includes values from a predetermined mid value to a predetermined low value; and if the temperature differential is in a third predetermined range, allowing operation of at least one compressor, in which operation is restricted, and restricting operation of at least one compressor, in which operation is allowed.

15. The method of claim 9 further comprising:

retrieving oil viscosity associations, wherein the oil viscosity associations includes associations between oil viscosities, suction pressures, and compressor sump temperatures;

determining a minimum compressor sump temperature to maintain a predetermined oil viscosity at the determined suction pressure based on the retrieved oil viscosity associations;

determining a second temperature differential based at least partially on the difference between the determined compressor sump temperature and the determined suction pressure; and managing one or more operations of the air conditioner based at least partially on the determined second temperature differential.

16. The method of claim 9 further comprising:

comparing the determined temperature differential to a fourth predetermined range, wherein the fourth predetermined range includes values less than a predetermined low value; and if the termination temperature is in the fourth predetermined range of temperatures, restricting operation of each compressor of the air conditioner and allowing operation of each crankcase heater.

17. The method of claim 16 further comprising:

determining second compressor sump temperatures for each of the compressors during operation of the crankcase heaters; and allowing operation of each of the crankcase heaters until at least one of:

each of the second compressor sump temperatures is greater than approximately 20 degrees Fahrenheit;

or the difference between a first second compressor sump temperature and a second compressor sump temperature is less than approximately 3 degrees Fahrenheit.

18. A method comprising:

allowing operation of an air conditioner;

determining whether a change in one or more operating conditions of the air conditioner has occurred;

allowing a first period of time to elapse if a determination has been made that a change in the system operating condition(s) has occurred;

determining a suction pressure of the air conditioner;

determining whether the determined suction pressure is greater than a predetermined maximum pressure; and reducing a speed of one or more evaporator fans if the determined suction pressure is greater than the predetermined maximum pressure;

wherein the predetermined maximum pressures comprises a predetermined suction pressure plus a variability coefficient.

19. The method of claim 18 further comprising maintaining a reduced speed for one or more of the evaporator fans until an additional change in one or more of the operating conditions.

20. The method of claim 18 further comprising:

determining a second suction pressure when the speed of one or more of the evaporator fans is reduced; and allowing one or more additional reductions in speed of one or more of the evaporator fans if the determined second suction pressure is greater than the predetermined maximum suction pressure.

* * * * *